(12) United States Patent
Gholap et al.

(10) Patent No.: US 7,760,927 B2
(45) Date of Patent: Jul. 20, 2010

(54) METHOD AND SYSTEM FOR DIGITAL IMAGE BASED TISSUE INDEPENDENT SIMULTANEOUS NUCLEUS CYTOPLASM AND MEMBRANE QUANTITATION

(75) Inventors: Abhijeet S. Gholap, Pune (IN); Gauri A. Gholap, Pune (IN); Aparna Joshi, Pune (IN); Amitabha Basu, Pune (IN); Chiruvolu V. K. Rao, Pune (IN); Prithviraj Jadhav, Pune (IN)

(73) Assignee: BioImagene, Inc., Sunnyvale, CA (US)

( * ) Notice: Subject to any disclaimer, the term of this patent is extended or adjusted under 35 U.S.C. 154(b) by 1105 days.

(21) Appl. No.: 11/361,774

(22) Filed: Feb. 23, 2006

(65) Prior Publication Data

US 2006/0188140 A1 Aug. 24, 2006

Related U.S. Application Data

(63) Continuation-in-part of application No. 10/966,071, filed on Oct. 15, 2004, and a continuation-in-part of application No. 10/938,314, filed on Sep. 10, 2004.

(60) Provisional application No. 60/655,465, filed on Feb. 23, 2005, provisional application No. 60/501,412, filed on Sep. 12, 2003, provisional application No. 60/515,582, filed on Oct. 30, 2003, provisional application No. 60/530,714, filed on Dec. 18, 2003.

(51) Int. Cl.
*G06K 9/00* (2006.01)
(52) U.S. Cl. .................................... 382/133; 128/922
(58) Field of Classification Search ................ 382/100, 382/128, 130, 131, 132, 133, 134; 128/922; 378/4–27
See application file for complete search history.

(56) References Cited

U.S. PATENT DOCUMENTS

| | | | |
|---|---|---|---|
| 6,519,355 B2 * | 2/2003 | Nelson | 382/133 |
| 6,546,123 B1 | 4/2003 | McLaren et al. | |
| 6,800,283 B2 | 10/2004 | Gong et al. | |
| 7,050,620 B2 * | 5/2006 | Heckman | 382/133 |
| 7,274,809 B2 * | 9/2007 | MacAulay et al. | 382/128 |
| 7,428,325 B2 * | 9/2008 | Douglass et al. | 382/128 |
| 2003/0170703 A1 | 9/2003 | Piper et al. | |
| 2003/0228694 A1 | 12/2003 | Sabatini | |

FOREIGN PATENT DOCUMENTS

WO    WO 03/030088 A1    4/2003

OTHER PUBLICATIONS

Fournier, et al., Prostate Cancer. Epidemiology. Risk factors. Pathology. Ann. Urol. (Paris). 2004; 36(5): 187-206.
Konig, K. Multiphoton microscopy in life sciences. J. Microsc. 2000; 200(2): 83-104.

(Continued)

*Primary Examiner*—Anand Bhatnagar
(74) *Attorney, Agent, or Firm*—Wilson Sonsini Goodrich & Rosati

(57) ABSTRACT

A method and system for automatic digital image based tissue independent simultaneous nucleus, cytoplasm and membrane quantitation. Plural types of pixels comprising cell components including at least cell cytoplasm and cell membranes from a biological tissue sample to which a chemical compound has been applied and has been processed to remove background pixels and pixels including counterstained components are simultaneously identified. The identified cell components pixels are automatically classified to determine a medical conclusion such as a human breast cancer, a human prostrate cancer or an animal cancer.

5 Claims, 14 Drawing Sheets

OTHER PUBLICATIONS

McLeod, et al. Pharmacogenomics: unlocking the human genome for better drug therapy. Annu. Rev. Pharmacol. Toxical. 2001; 41: 101-21.

Southern, E. DNA microarrays. History and overview. Methods Mol. Biol. 2001; 170: 1-15.

Tabesh, et al. Automated prostate cancer diagnosis and Gleason grading of tissue microarrays. Proceedings of SPIE, 2005; 5747:58-70.

Teveroskiy, et al. Improved prediction of prostate cancer recurrence based on an automated tissue image analysis system. IEEE International Symposium. Arlington, VA. Apr. 15-18, 2004; 257-160.

Tyres, et al. From genomics to proteomics. Nature. 2003; 422(6928): 193-7.

Winters, et al. Cytoplasmic p21WAF1/CIP1 expression is correlated with HER-2/neu in breast cancer and is an independent predictor of prognosis. Breast Cancer Res. 2003; 5(6): R242-9.

* cited by examiner

FIG. 9
PIXEL 'P' AND ITS EIGHT NEIGHBORS
FOUR TEMPLATES USED TO FIND DIRECTIONAL PIXELS
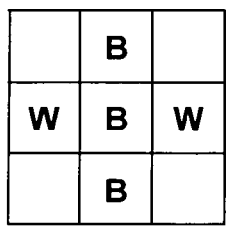 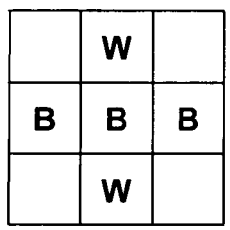 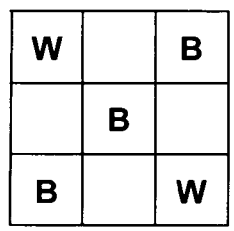 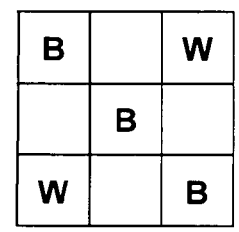
    A            B            C            D
B: BLACK PIXEL, W: WHITE PIXEL

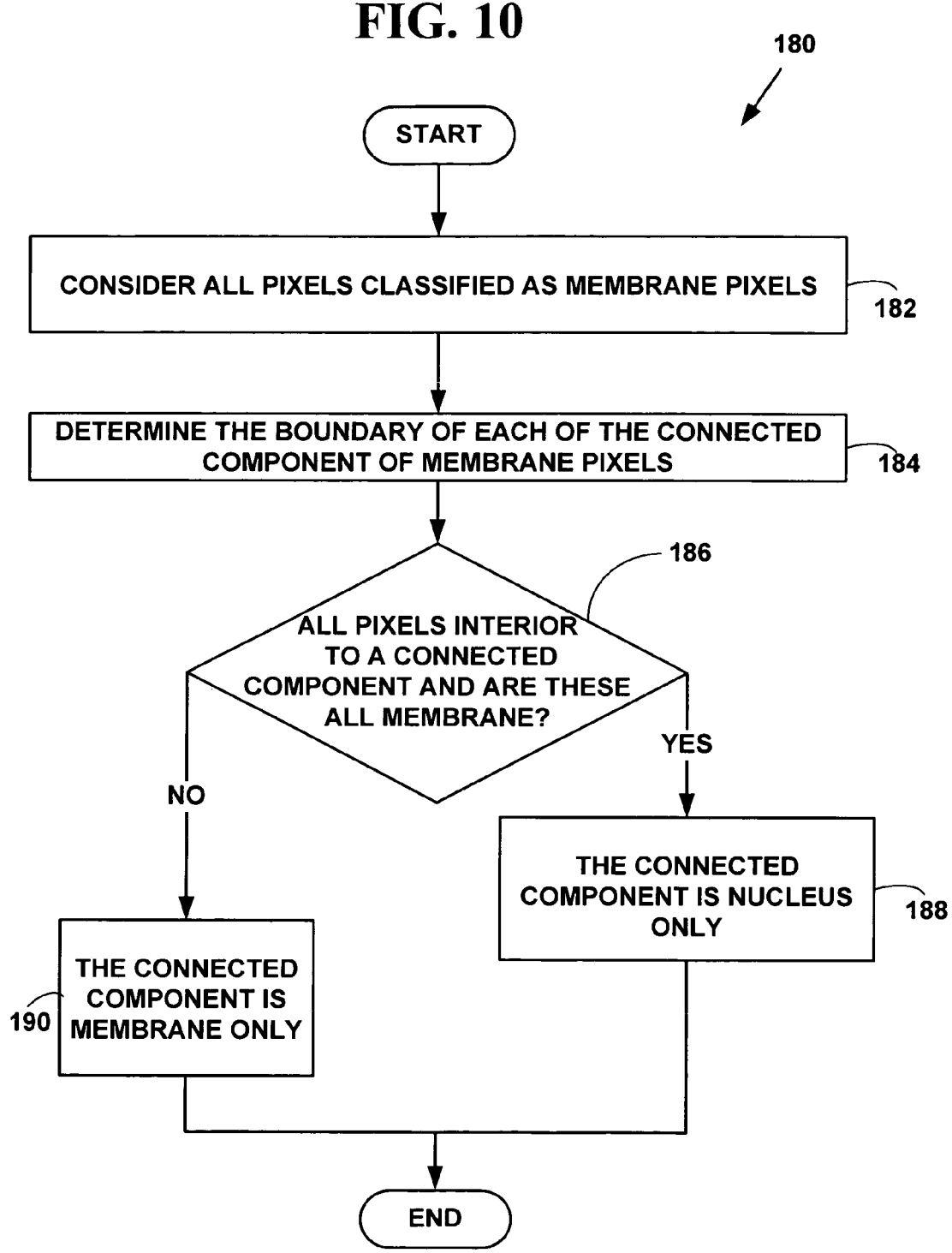

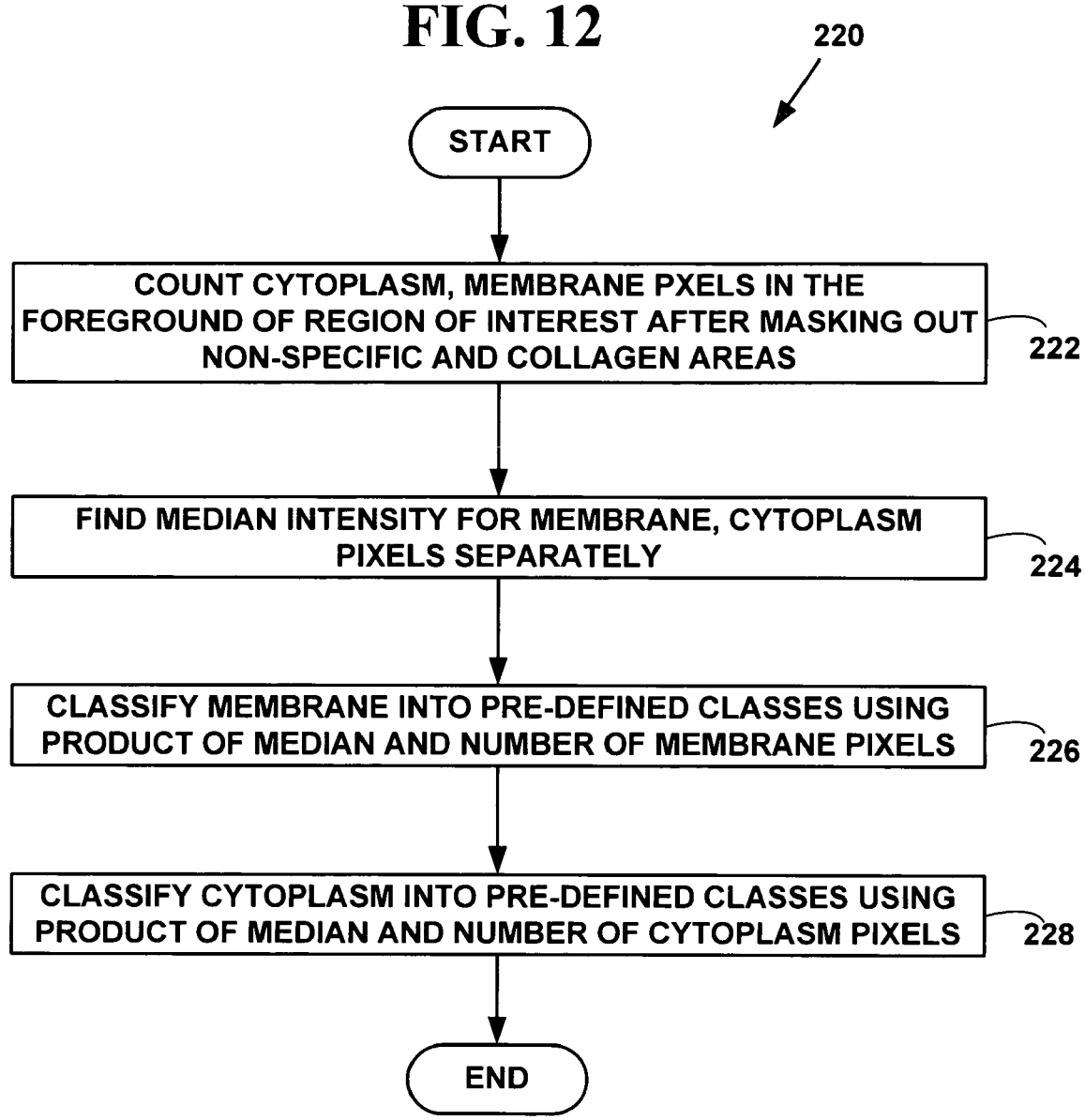

METHOD AND SYSTEM FOR DIGITAL IMAGE BASED TISSUE INDEPENDENT SIMULTANEOUS NUCLEUS CYTOPLASM AND MEMBRANE QUANTITATION

CROSS REFERENCES TO RELATED APPLICATIONS

This application claims priority to U.S. Provisional Patent Application No. 60/655,465, filed Feb. 23, 2005, the contents of which are incorporated by reference. This application is a CIP of U.S. patent application Ser. No. 10/938,314, filed Sep. 10, 2004, which claims priority to U.S. Provisional Patent Application No. 60/501,412, filed Sep. 10, 2003, and U.S. Provisional Patent Application No. 60/515,582 filed Oct. 30, 2003, and this application is a alp of U.S. patent application Ser. No. 10/966,071, filed Oct. 15, 2004 which claims priority to U.S. Provisional Patent Application No. 60/530,714, filed Dec. 18, 2003, the contents of all of which are incorporated by reference.

COPYRIGHT NOTICE

Pursuant to 37 C.F.R. 1.71(e), applicants note that a portion of this disclosure contains material that is subject to and for which is claimed copyright protection, such as, but not limited to, digital photographs, screen shots, user interfaces, or any other aspects of this submission for which copyright protection is or may be available in any jurisdiction. The copyright owner has no objection to the facsimile reproduction by anyone of the patent document or patent disclosure, as it appears in the U.S. Patent Office patent file or records. All other rights are reserved, and all other reproduction, distribution, creation of derivative works based on the contents of the application or any part thereof are prohibited by applicable copyright law.

FIELD OF THE INVENTION

This invention relates to digital image processing. More specifically, it relates to a method and system for automatic digital image based tissue independent simultaneous nucleus, cytoplasm and membrane quantitation.

BACKGROUND OF THE INVENTION

As is known in the art, medical, life science and biotechnology experiments typically produce large amounts of digital information and digital images. Such experiments include study in disciplines such as genomics, proteomics, pharmacogenomics, molecular imaging, diagnostic medical imaging includes histopathology, cell-cycle analysis, genetics, magnetic resonance imaging (MRI), digital x-ray and computed tomography (CT). Converting large amounts raw data including raw data on digital images generated in these experiments into meaningful information that can be used by an analyst to formulate an opinion remains a challenge that hinders many investigators.

As is known in the art, genomics is the study of genomes, which includes genome mapping, gene sequencing and gene function. Gene expression microarrays are revolutionizing the biomedical sciences. A DNA microarray consists of an orderly arrangement of DNA fragments representing the genes of an organism. Each DNA fragment representing a gene is assigned a specific location on the array, usually a glass slide, and then microscopically spotted (<1 mm) to that location. Through the use of highly accurate robotic spotters, over 30,000 spots can be placed on one slide, allowing molecular biologists to analyze virtually every gene present in a genome. A complementary DNA (cDNA) array is a different technology using the same principle; the probes in this case are larger pieces of DNA that are complementary to the genes one is interested in studying. High-throughput analysis of micro-array data requires efficient frame work and tools for analysis, storage and archiving voluminous image data. For more information see "DNA Microarrays. History and overview" by E. M. Southern, Methods Molecular Biology Journal, 170: 1-15, 2001.

As is known in the art, proteomics is the study of the function of expressed proteins and analysis of complete complements of proteins. Proteomics includes the identification and quantification of proteins, the determination of their localization, modifications, interactions, activities, and, ultimately, their function. In the past proteomics is used for two-dimensional (2D) gel electrophoresis for protein separation and identification. Proteomics now refers to any procedure that characterizes large sets of proteins.

Rapid growth of this field is driven by several factors—genomics and its revelation of more and more new proteins; powerful protein technologies, such as newly developed mass spectrometry approaches, global two-hybrid techniques, and spin-offs from DNA arrays. See for example, "From genomics to proteomics," by M. Tyers and M. Mann in Nature Journal 2003, 13:422(6928):203-7. Large-scale data sets for protein-protein interactions, organelle composition, protein activity patterns and protein profiles in cancer-patients are generated in the past few years. Rapid analysis of these data sets requires innovative information driven framework and tools to process, analyze, and interpret prodigious amounts of data.

Tissuemicroarrays (TMA) work on the similar principles of DNA microarrays where large number of tissue samples are placed on a single slide and analyzed for these expression of proteins. The image data generated in such cases is tremendous and require efficient software analysis tools. TMA analysis involves reporting protein to be detected by immunohistochemical (IHC), immunofluorescence, luminescence, absorbance, and reflection detection.

As is known in the art, pharmacogenomics is the field of investigation that aims to elucidate the inherited nature of inter-individual differences in drug disposition and effects, with the ultimate goal of providing a stronger scientific basis for selecting the optimal drug therapy and dosages for each patient. There is great heterogeneity in the way humans respond to medications, often requiring empirical strategies to find the appropriate drug therapy for each patient. There has been great progress in understanding the molecular basis of drug action and in elucidating genetic determinants of disease pathogenesis and drug response. These genetic insights should also lead to mechanism-based approaches to the discovery and development of new medications. See, for example, "Pharmacogenomics: Unlocking the Human Genome for Better Drug Therapy," by Howard L. McLeod, William E. Evans in Annual Review of Pharmacology and Toxicology 2001, Vol. 41: 101-121. Collection, analysis and maintenance of inter-individual differences data sets requires efficient information driven framework and tools to process, analyze, and interpret prodigious amounts of data.

Microscopy and molecular imaging include the identification of changes in the cellular structures indicative of disease remains the key to the better understanding in medicinal science. Microscopy applications as applicable to microbiology (e.g., gram staining), Plant tissue culture, animal cell culture (e.g. phase contrast microscopy), molecular biology, immunology (e.g. ELISA), cell biology (e.g., immunofluorescence, chromosome analysis) Confocal microscopy: Time-Lapse and Live Cell Imaging, Series and Three-Dimensional (3D) Imaging. The advancers in confocal microscopy have unraveled many of the secrets occurring within the cell and the transcriptional and translational level changes can be detected using fluorescence markers. One advantage of the confocal approach results from the capability to image individual optical sections at high resolution in sequence through a specimen. Framework with tools for 3D analysis of thicker sections, differential color detection, fluorescence in situ hybridization (FISH) etc., is needed to expedite the progress in this area.

Near infrared (NIR) multiphoton microscopy is becoming a novel optical tool for fluorescence imaging with high spatial and temporal resolution, diagnostics, photochemistry and nanoprocessing within living cells and tissues. NIR lasers can be employed as the excitation source for multifluorophor multiphoton excitation and hence multicolour imaging. In combination with FISH, this novel approach can be used for multi-gene detection (multiphoton multicolour FISH). See, for example, "Multiphoton microscopy in life sciences" by Konig K. in Journal of Microscopy, 2000, Vol. 200 (Part 2):83-104.

In-vivo imaging: Animal models of cancer are inevitable in studies that are difficult or impossible to perform in people. Imaging of in-vivo markers permit observations of the biological processes underlying cancer growth and development. Functional imaging—the visualization of physiological, cellular, or molecular processes in living tissue—would allows to study metabolic events in real time, as they take place in living cells of the body.

Diagnostic medical imaging: Imaging technology has broadened the range of medical options in exploring untapped potential for cancer diagnosis. X-ray mammography already has had a lifesaving effect in detecting some early cancers. Computed tomography (CT) and ultrasound permit physicians to guide long, thin needles deep within the body to biopsy organs, often eliminating the need for an open surgical procedure. CT scan images can reveal whether a tumor has invaded vital tissue, grown around blood vessels, or spread to distant organs; important information that can help guide treatment choices. Three dimensional image reconstruction and visualization techniques require significant processing capabilities using smaller, faster, and more economical computing solutions.

Histopathology is a very visual science. For example, cancers grow in recognizable patterns that allow for their automated identification. A breast cancer melanoma has a certain growth pattern that differs from a carcinoma of the prostate. Benign conditions also have patterns. Skin rashes, for example, are diagnosed by a combination of a type of inflammatory cells and location in the skin, that is, whether the inflammation is around blood vessels, within the epidermis, scattered, etc.

In the field of Histopathology including oncology, the detection, identification, quantification and characterization of cells of interest, such as cancer cells, through testing of biological samples is an important aspect of experimentation. Typically, a tissue sample is prepared by staining the tissue with dyes to identify cells of interest.

Examination of biological tissues typically has been performed manually by either a lab technician or a pathologist or a life science and biotechnology researcher. In the manual method, a slide prepared with a biological sample is viewed at a low magnification under a microscope to visually locate candidate cells of interest. Those areas of the slide where cells of interest are located are then viewed at a higher magnification to confirm those objects as cells of interest, such as tumor or cancer cells.

Diagnostic methods in pathology carry out the detection, identification, quantification and characterization of cells of interest. For example, in oncology, detection of cancer cells can be done by various methods, such as contrast enhancement by different dyes or by using a specific probe such an monoclonal antibody that reacts with component of cells of interest or by probes that are specific for nucleic acids.

In the last few years, slides with stained biological samples are photographed to create digital images from the slides. Digital images are typically obtained using a microscope and capturing a digital image of a magnified biological sample.

The ability to detect, through imaging, the histopathological image data for the molecular and phenotypic changes associated with a tumor cell will enhance pathologists ability to detect and stage tumors, select appropriate treatments, monitor the effectiveness of a treatment, and determine prognosis.

Cancer is an especially pertinent target of micro-array technology due to the well-known fact that this disease causes, and may even be caused by, changes in gene expression. Micro-arrays are used for rapid identification of the genes that are turned on and the genes that are turned off in tumor development, resulting in a much better understanding of the disease. For example, if a gene that is turned on in that particular type of cancer is discovered, it may be targeted use in cancer therapy.

Today, therapies that directly target malfunctioning genes are already in use and showing exceptional results. Micro-arrays are also used for studying gene interactions including the patterns of correlated loss and increase of gene expression. Gene interactions are studied during drug design and screening. Large number of gene interactions studied during a drug discovery requires efficient frame work and tools for analysis, storage and archiving voluminous image data.

A standard test used to measure protein expression is immunohistochemistry (IHC). Analyzing the tissue samples stained with IHC reagents has been the key development in the practice of pathology. Normal and diseased cells have certain physical characteristics that can be used to differentiate them from each other. These characteristics include complex patterns, rare events, and subtle variations in color and intensity.

Cancers of the epithelial cells are the most common cancers, about 90% of the total cancers diagnosed. Therefore, identification of epithelial cells in a given digital image is a first step towards an actual identification of a cancer marker being searched for. For example, identification of ER/PR, Her2, or other markers in the breast cancer tissues. In breast cancer tissues, one specific marker searched for is ER/PR, present only in epithelial cells. Thus, a first step is to identify an epithelial part of a tissue sample. A pathologist, because of years of experience immediately differentiates an epithelial part of a tissue sample from a stromal part and looks for a specific marker. However, for a method to work on identification of a specific marker in the given tissue, it is essential to identify and differentiate the epithelial cell areas from the non-epithelial cell areas.

The importance of differentiating epithelial cell areas in a digital has multiple applications. Apart from identifying a cancer, it is critical to distinguish invasive carcinomas (IC) from noninvasive lesions. Since, cancer is life threatening when it becomes invasive, it carries a potential for spreading and metastasis. Therefore an accurate diagnosis of a presence, or absence of stromal invasion is essential.

Identification of the epithelial cell areas of a given digital image is a first step towards an automation of an entire pathological analysis through microscopy and would help in the applications such as, Nuclear pleomorphism. Mitotic Count, Tubule formation, Detection of markers stained by IHC, etc.

Cancer identification in human is possible in part because of differential staining of tissue samples achieved by specific methods of staining such as Haematoxylin and Eosin (H/E) staining. Hematoxillin and Eosin (H/E) method of staining is used to study the morphology of tissue samples. Based on the differences and variations in the patterns from the normal tissue, a type of cancer is determined. Also the pathological grading or staging of cancer (Richardson and Bloom Method) is determined using the H/E staining. This pathological grading of cancer is not only important from diagnosis angle but has prognosis value attached to it As is known in the medical arts, an over expression of proteins can be used to indicate the presence of certain medical diseases. For example, in approximately 20%-30% patients with breast cancer, tumor cells show an amplification and/or over expression of human epidermal receptor-2 (HER-2), a tyrosine kinase receptor. HER-2 is a human epidermal growth factor receptor, which is also known as c-erbB-2/neu. HER-2/neu (C-erbB2) is a proto-oncogene that localizes to chromosome 17q. Protein product of this gene is typically over-expressed in breast cancers. This over expression in majority of cases (e.g., 90%-95%) is a direct result of gene amplification. Over expression of HER-2/neu protein thus has prognostic significance for mammary carcinoma.

Clinical studies in patients with breast cancer over the last decade have convincingly demonstrated that amplification/ over expression of HER-2/neu is associated with a poor medical prognosis. Approximately 20%-30% of invasive breast carcinomas are HER-2/neu amplified. It has also been shown to be increased in a variety of other human malignancies including that of kidney, bladder and ovary. Gene amplification of HER-2/neu is associated with aggressive cell behavior and poor prognosis.

The presence of HER-2 over expression is associated with more aggressive forms of cancer (found in 25% to 30% of breast cancers). Therefore determination of HER-2 overexpression is a predictive factor in the therapy of breast cancer. HER-2 overexpression was shown to signify resistance to cyclophosphamide/methotrexate/5-fluoracil therapy and tamoxifen therapy. Also higher sensitivity to the high doses of anthracycline containing regimens has been observed.

Normal epithelial cells typically contain two copies of the HER-2/neu gene and express low levels of HER-2/neu receptor on the cell surface. In some cases, during oncogenic transformation the number of gene copies per cell is increased, leading to an increase in messenger Ribonucleic Acid (mRNA) transcription and a 10- to 100-fold increase in the number of HER-2/neureceptors on the cell's surface, called overexpression.

In general, the presence of HER-2/neu overexpression appears to be a key factor in malignant transformation and is predictive of a poor prognosis in breast cancer. A standard test used to measure HER-2/neu protein expression is IHC. IHC has been specifically adapted for detection of HER-2/neu protein using specific antibodies. As seen with most of the histopathological analysis, there is inter-laboratory variation in HER-2/neu overexpression scoring due to subjective measures of staining intensity and pattern. It is widely acknowledged that the ideal test for HER-2 status is one that is simple to perform, specific, sensitive, standardized, stable over time, and allows archival tissue to be assayed. At present the test that best meets these criteria is IHC.

Evaluation of HER-2/neu has become all the more important with the development of Herceptin® (i.e., trastuzumab package insert) which directly targets the HER-2/neu protein and appears to be useful in late stage metastatic adenocarcinoma of the breast. Thus, the evaluation of HER-2/neu is clinically important for at least two things; the first is, as a predictive marker for response to Herceptin® therapy and the second is, as a prognostic marker. Analysis of HER-2/neu amplification is the sole criteria for treatment with Herceptin. To summarise, accurate detection of HER-2/neu amplification is important in the prognosis and selection of appropriate therapy and prediction of therapeutic outcome.

Prostate cancer (i.e., prostate adenocarcinoma) has become an important concern in terms of public health these past fifteen years internationally as well. A recent French epidemiological study revealed 10,104 deaths due to this disease in 2000 (See Fournier G, Valeri A, Mangin P, Cussenot O. Prostate cancer: Epidemiology, Risk factors, Pathology. Ann Urol (Paris). October 2004; 38(5):187-206). In 2001, there were 30,142 new cases of prostate cancer diagnosed in the UK (See info.cancerresearchuk.org/cancerstats/ prostate/incidence/). The American Cancer Society (ACS) estimates that about 230,900 new cases will be diagnosed in 2004 and about 29,900 men will die of the disease. (See urologychannel.com/prostate/cancer/index.shtml).

A little-known fact is that a man is 33% more likely to develop prostate cancer than an American woman is to get breast cancer. (See www.prostatecancerfoundation.org). Prostate cancer strikes as many men (and causes almost as many deaths annually) as breast cancer does in women, but lacks the national awareness and research funding breast cancer currently receives.

Only a biopsy can definitely confirm prostate cancer. Typically, the physician takes multiple tissue samples for biopsy. Instead of doing the classic right and left prostate biopsies and put them into two specimen jars, more and more urologists are now using 12 jars for multiple tissue sample cores (or at least greater than 8 biopsy cores). This new approach, so-called 'extended prostate biopsy procedure', improved the cancer detection rate and many cancers can be detected earlier. But, it adds more work to histopathologists in the usual manual screening of those slides.

Diagnostic methods in pathology carry out the detection, identification, quantitation and characterization of cells of interest. For example, in oncology, detection of cancer cells can be done by various methods, such as contrast enhancement by different dyes or by using a specific probe such an monoclonal antibody that reacts with component of cells of interest or by probes that are specific for nucleic acids.

IHC is a technique that detects specific antigens present in the target cells by labeling them with antibodies against them which are tagged with enzymes such as alkaline phosphatase or horseradish peroxidase (HRP) to convert a soluble colorless substrate to a colored insoluble precipitate which can be detected under the microscope. Enzyme-conjugated secondary antibodies help visualize the specific staining after adding the enzyme-specific substrate. Tissue labeled with antibodies tagged to HRP shows a brown colour deposited because of conversion of substrate of 3',3-diaminobenzidine tetrahydrochloride (DAB) by HRP. It gets localized at the site where the marker is expressed in the cell. For example, HER-2/neu is localized at the cell membrane marking the cell membrane completely or partially. To enhance the contrast cells are counterstained with haematoxylin which stains the nuclei blue-black.

With standardization of laboratory testing and appropriate quality control in place, the reliability of IHC will be improved further. Though a more sensitive reproducible and reliable method for detection of HER-2/neu amplification at gene level is fluorescence in situ hybridization (FISH), IHC remains the most common and economical method for HER-2/neu analysis.

In the field of medical diagnostics including oncology, the detection, identification, quantification and characterization of cells of interest, such as cancer cells, through testing of biological samples is an important aspect of diagnosis. Typically, a tissue sample is prepared by staining the tissue with dyes to identify cells of interest.

Examination of biological tissues typically has been performed manually by either a lab technician or a pathologist. In the manual method, a slide prepared with a biological sample is viewed at a low magnification under a microscope to visually locate candidate cells of interest. Those areas of the slide where cells of interest are located are then viewed at a higher magnification to confirm those objects as cells of interest, such as tumor or cancer cells.

In the last few years, slides with stained biological samples are photographed to create digital images from the slides. Digital images are typically obtained using a microscope and capturing a digital image of a magnified biological sample.

A digital image typically includes an array, usually a rectangular matrix, of pixels. Each "pixel" is one picture element and is a digital quantity that is a value that represents some property of the image at a location in the array corresponding to a particular location in the image. Typically, in continuous tone black and white images the pixel values represent a "gray scale" value.

Pixel values for a digital image typically conform to a specified range. For example, each array element may be one byte (i.e., eight bits). With one-byte pixels, pixel values range from zero to 255. In a gray scale image a 255 may represent absolute white and zero total black (or visa-versa).

Color images consist of three color planes, generally corresponding to red, green, and blue (RGB). For a particular pixel, there is one value for each of these color planes, (i.e., a value representing the red component, a value representing the green component, and a value representing the blue component). By varying the intensity of these three components, all colors in the color spectrum typically may be created.

However, many images do not have pixel values that make effective use of the full dynamic range of pixel values available on an output device. For example, in the eight-bit or byte case, a particular image may in its digital form only contain pixel values that fall somewhere in the middle of the gray scale range. Similarly, an eight-bit color image may also have RGB values that fall within a range some where in middle of the range available for the output device. The result in either case is that the output is relatively dull in appearance.

The visual appearance of an image can often be improved by remapping the pixel values to take advantage of the full range of possible outputs. That procedure is called "contrast enhancement." While many two-dimensional images can be viewed with the naked eye for simple analysis, many other two-dimensional images must be carefully examined and analyzed. One of the most commonly examined/analyzed two-dimensional images is acquired using a digital camera connected to an optical microscope.

One type of commonly examined two-dimensional digital images is digital images made from biological samples including cells, tissue samples, etc. Such digital images are commonly used to analyze biological samples including a determination of certain knowledge of medical conditions for humans and animals. For example, digital images are used to determine cell proliferate disorders such as cancers, etc. in humans and animals.

There are several problems associated with using existing digital image analysis techniques for analyzing digital images for determining know medical conditions. One problem is that existing digital image analysis techniques are typically used only for analyzing measurements of chemical compounds applied to biological samples such as groups of cells from a tissue sample. Another problem is the manual method used by pathologists is time consuming and prone to error including missing areas of the slide including tumor or cancer cells.

There have been attempts to solve some of the problems associated with manual methods for analyzing biological samples. Automated cell analysis systems have been developed to improve the speed and accuracy of the testing process. For example, U.S. Pat. No. 6,546,123 entitled "Automated detection of objects in a biological sample" that issued to McLaren, et al. teaches "A method, system, and apparatus are provided for automated light microscopic for detection of proteins associated with cell proliferative disorders."

U.S. Patent Published Application No. 20030170703 entitled "Method and/or system for analyzing biological samples using a computer system" published by Piper et al. teaches "A method and/or system for making determinations regarding samples from biologic sources. A computer implemented method and/or system can be used to automate parts of the analysis."

Medical oncology is entering into the arena of "customized" treatment of cancer based on the presence of molecular targets or particular patient/tumor characteristics. The fields of pharmacogenetics and pharmacogenomics are rapidly expanding. The long term view on drug development appears to indicate that therapies to treat cancer will proceed down a path of selection based upon these molecular targets. The ability to efficiently and precisely identify these targets is more critical now than ever before in the cancer therapy development process.

The genomics and proteomics revolution has left scientists with too many early-stage targets for the next generation of drug discovery efforts. It is desirable to use a molecular pathology approach to provide the pharmaceutical industry with information that allows prioritization of potential targets and selection of those with the most significance to major human diseases and easy and standardized method in allowing them to do so.

On the technology front, there is need to develop tools and methods to study the cellular structures/activities that become disturbed in the disease. Further such tools should enable drug discovery researchers in analyzing cell compartments like nucleus, cytoplasm or cell membrane of carcinoma cells. It is known that some of diacylglycerol kinases under go a translocation from the cytoplasm to the plasma membrane. The ability to automatically identify and quantify such translocations in a biopsy specimen will aid discovery research.

TMA analysis has changed the pace at which a pharmaceutical companies can discover newer drugs. One of the requirements of rapid analysis of cores from a tissue micro array is tissue independent pathological analysis. The basic aspects of cells like nucleus, cytoplasm and membrane do not vary with tissues in the sense overall histology but can vary and are present all across the tissues. Identifying these basic components of cells/tissues based on staining intensity and morphology is necessary to achieve true tissue independence for automated analysis.

There is a considerable gap between the pace at which drug discovery is progressing and automated tools available to assist the drug researcher. Often researchers are forced to resort to manual methods which are subjective, time consuming and could be inconsistent. Thus, it is desirable to provide a solution to this problem by using digital image based tissue independent simultaneous nucleus, cytoplasm and membrane quantitation.

There have been several attempts to provide quantitation of nucleus, cytoplasm or membrane individually.

For example, Zoë E Winters et al reported a study of subcellular $p21^{WAF1/CIP1}$ expression in relation to HER-2 immunoreactivity in an article titled "Cytoplasmic $p21^{WAF1/CIP1}$ expression is correlated with HER-2/neu in breast cancer and is an independent predictor of prognosis". This study highlights a new pathway by which HER-2 may modify cancer behaviour. HER-2 as a predictor of poor prognosis may partly relate to its ability to influence the relocalisation of $p21^{WAF1/CIP1}$ from the nucleus to the cytoplasm, resulting in a loss of $p21^{WAF1/CIP1}$ tumour suppressor functions. Cytoplasmic $p21^{WAF1/CIP1}$ may be a surrogate marker of functional HER-2 in vivo.

HER-2 is one of four Erb B family-type I receptor tyrosine kinases and is the preferred dimerization partner for the epidermal growth factor receptor. The Erb B receptors are important in normal development and in human cancer. HER-2, independent of its own ligand, activates other Erb B receptors to increase their ligand affinity and to amplify biological responses. HER-2 plays a key role in activating cytoplasmic signalling through the phosphatidylinositol-3 kinase (PI-3K)/protein kinase B (Akt) and mitogen-activated protein kinase pathways to influence transcription of nuclear genes. Activation of PI-3K/Akt is involved in cell proliferation and confers resistance to apoptosis. Breast cancer is associated with deregulated expression of HER-2, detectable as HER-2 amplification or protein overexpression identified in 10-40% of tumours. HER-2 expression is indicative of poor prognosis and may predict tumour responses to hormone therapy and chemotherapy. Cell cycle progression is regulated by cyclin-dependent kinases (CDKs) associated with cyclin proteins. $p21^{WAF1/CIP1}$, a downstream target of p53, is a CDK inhibitor that re-enforces p53-mediated G1 and G2 arrest following genotoxic insults, to facilitate DNA repair. The integrity of G1 and G2 checkpoints requires the nuclear localisation of $p21^{WAF1/CIP1}$. Recent evidence including subcellular fractionation suggests that $p21^{WAF1/CIP1}$ can localise in the cytoplasm in cancer tissues and cell lines, where it inhibits apoptosis by binding and inhibiting the apoptosis signal-regulating kinase 1. Such an anti-apoptotic function in breast cancers could underlie the association between cytoplasmic $p21^{WAF1/CIP1}$ and poor prognosis. Upregulation of $p21^{WAF1/CIP1}$ occurs through PI-3K/Akt signalling, and may involve insulin-like growth factors, p53-dependent pathways or HER-2 expression. A HER-2-overexpressing breast cancer cell line transcriptionally upregulates $p21^{WAF1/CIP1}$ and has been shown to produce its cytoplasmic localisation through a mechanism whereby Akt binds and phosphorylates $p21^{WAF1/CIP1}$ in its nuclear localisation signal. In vivo HER-2 expression may involve changes in the subcellular localisation of $p21^{WAF1/CIP1}$ to influence the outcome in breast cancer.

In "Dissecting the molecular mechanisms of human cancer: Translating laboratory advances into clinical practice", A. M. Thompson, discussed the scope and limitations of various techniques used for tissue analysis. Immunohistochemsity can solve some of the problem faced by other techniques. For example in other techniques like FISH the architecture and spatial relationships of the cancer tissue to surrounding structures and whether it is the cancer tissue or the stroma or lymphocytes being examined is usually unclear. Immunohistochemistry has the advantage of demonstrating the presence of proteins and in which cells and cellular compartments the protein is present. It can be used to supplement the techniques already outlined or protein analyses such as western blotting or enzyme-linked immuno-sorbent assay (ELISA) techniques and by using a range of antibodies to a particular protein, functional associations can be implied.

In "Development and Characterization of Immunohistochemistry and Fluorescence in situ Hybridization Diagnostic Assay Kits for Use in the Selection of Patients for Treatment with a Particular Therapeutic Agent", Susan Jerian indicated that that therapies to treat cancer will proceed down a path of selection based upon these molecular targets. The ability to efficiently and precisely identify these targets is more critical in the cancer therapy development process. Two major areas of concern expressed are: (1) the systematic and science based incorporation of molecular target assay development into anti-cancer therapy development programs and (2) the identification of information which clinicians need to know in order to select the proper testing modality and to interpret those results.

In order to approve therapies which are intended for use in patients whose tumors express a particular molecular trait (e.g. protein overexpression, gene amplification, or genetic polymorphism), the FDA, Center for Biologics Evaluation and Research (CBER) has required that the diagnostic assay for identification of that molecular trait be available to physicians either through central laboratory testing or as a Center for Devices and Radiological Health (CDRH) approved PMA (Pre-Market Approval) for a device or test kit.

Two other diagnostic techniques: (1) immunohistochemistry (IHC), a technology now widely available in most pathology laboratories, and a preferred method for identification of protein overexpression, and (2) fluorescence in situ hybridization (FISH), a technique less widely available, but rapidly becoming a preferred method for identification of gene amplification.

Difficulties are reported with the performance and interpretation of IHC and FISH in the medical oncology community over the last several years. In particular the detection of estrogen and progesterone receptors and the detection of HER2/neu targets is not consistent. Problems encountered include, but are not limited to, identification of cutoff points in assay scores to define positive vs. negative results, broad interlaboratory variability in performance of the assays, discrepancies between laboratories with high volume vs low volume throughput, use of "home brew" antibodies for IHC, deviations from recommended methods in the package insert leading to altered performance characteristics of the assays, conflicting data in the published literature, and lack of data from prospectively conducted studies.

There are several problems associated with using existing digital image analysis techniques for analyzing FISH images. 1) there is need to image specimen slides at a very high resolution to count small fluorescent signals. Once there are a large number of image sections to be processed together, issues like seamless composition of tiles becomes an issue. 2) Further, one needs to prepare a separate slide and capture images through fluorescent microscope. 3) Another problem with FISH based analysis is the need to stack planes in three dimensions to get a focused image. Otherwise, the small fluorescent signals far below the surface of the tissue will give weak, blurred ring of fluorescent signals. 4) Immunohistochemistry is preferable to FISH as primary test for HER-2.because FISH testing is more costly and more time consuming, they suggest that immunohistochemistry should be the method of choice, with FISH reserved for specimens with indeterminate results. Failure to obtain interpretable results after two test runs occurred in 5.0% of samples tested by FISH and 0.08% of those tested by immunohistochemistry. 5) FISH is more expensive, the reports indicate, with reagent costs averaging $140 compared with $10 for immunohistochemistry. Procedure time and interpreting time by the pathologist are both about nine times higher for FISH. 6) FISH can be carried out with fresh tissues and frozen tissues but not with specimens or cores in a TMA.

Elizabeth L. Wiley and Leslie K. Diaz commented that "the combined use of FISH and immunohistochemistry will achieve more accuracy and clinical efficacy than the use of either test alone," in a related editorial. Gown's group recommended a testing algorithm for HER-2 determination in which primary screening is performed with immunohistochemistry. FISH would then be required for the approximately 15% of samples with indeterminate (2+) immunohistochemistry scores.

In U.S. Pat. No. 6,800,283 entitled "Isolated human casein kinase proteins, nucleic acid molecules encoding human casein kinase proteins, and uses thereof," that issued to Gong, et al. teaches The present invention provides amino acid sequences of peptides that are encoded by genes within the human genome, the kinase peptides of the present invention. The present invention specifically provides isolated peptide and nucleic acid molecules, methods of identifying orthologs and paralogs of the kinase peptides, and methods of identifying modulators of the kinase peptides."

In United States Published Patent Application 20030228694, published by Sabatini, entitled In "Using immunohistochemistry to study plant metabolism: the examples of its use in the localization of amino acids in plant tissues, and of phosphoenolpyruvate carboxykinase (PEPCK) and its possible role in pH regulation", illustrated two of the several potential uses of Immunohistochemistry in plant histology, namely, determination of the location of amino acids and enzymes and establishing a functional role of certain enzymes based on their location in the plant tissues. Immunohistochemistry has been widely used to localize antigens in plant tissues. The localization of enzymes by immunohistochemistry has provided valuable information about how metabolism is compartmentalized between different tissues in many plant structures such as the vasculature, developing seeds, fruit, leaves and stems and roots. An advantage of immunohistochemistry is that it reveals the location and abundance of the protein whereas visualization of mRNA by in situ hybridization may not.

Using immunohistochemistry it was found that, in many plants, PEPCK was present in tissues that are likely to be active in the metabolism of nitrogen, such as developing seeds and the vasculature, and in these it was particularly abundant in regions where metabolism of amino acids is likely to be enhanced. However, to investigate what, if any, this function might be in nitrogen metabolism required immunohistochemistry to be used in combination with other approaches.

On the website, protocol-online (www.protocol-online.org/prot/Immunology/Immunohistochemistry/) it is stated, Immunohistochemistry is a method of detecting the presence of specific proteins in cells or tissues and consists of the following steps: 1) primary antibody binds to specific antigen; 2) antibody-antigen complex is bound by a secondary, enzyme-conjugated, antibody; 3) in the presence of substrate and chromogen, the enzyme forms a colored deposit at the sites of antibody-antigen binding.

On the website (www.ihcworld.com/_protocols/general_IHC/immunoenzyme_double.htm), it is stated that this enzyme based double staining method is limited for the demonstration of two proteins at different locations. For example, one is nuclear protein, the other is cytoplasmic protein.

20/20 gene systems, Inc. (www.2020gene.com/TissueBlotKits_frame.htm) has applied Layered Gene Scanning (LGS) to the analysis of proteins in whole tissue sections. This platform is claims to preserve the two-dimensional morphology of the tissue combining this advantage of immunohistochemistry (IHC) with the high throughput and ease of use of microarrays.

IHC is also used in veterinary diagnostics. Neoplastic and infectious diseases are often the main focus of IHC in veterinary medicine. 1 Diagnosis of neoplasia. Often, the tissue origin of a tumor cannot be determined with routine histology. Using specific antibodies for different tissues or cells (e.g., cytokeratin for epithelium, vimentin for mesenchymal cells, lymphoid markers, etc); the origin of many tumors can be determined with IHC. 2 Detection of micrometastases. Early metastasis can be difficult to detect using conventional histology. IHC highlights the presence of single or small groups of neoplastic cells in metastatic sites. Early detection of micrometastases increases the chances of survival with surgical removal of affected nodes or by modification of the treatment protocol. 3 Prognostic markers. Some proteins are expressed in neoplastic, but not in normal mature cells (e.g. embryonal proteins), expressed in neoplastic cells in larger amounts than in normal cells (e.g. cycle-related proteins), or structurally modified in neoplastic cells (mutant p53 protein). These changes may have prognostic significance in specific tumor types. It has been reported recently that the immunohistochemical detection of KIT protein in mast cell tumors of dogs has prognostic significance. We are testing some of these markers to determine their significance in veterinary cancers. 4 Diagnosis of infectious diseases. Detection of antigens of an infectious agent with IHC has etiologic significance. The advantage of IHC over microbiologic techniques is that antigen detection can be correlated with histopathologic changes and thus can confirm the significance of a particular bacterial or viral isolate obtained by other methods. The ADDL offers immunohistochemical tests for infectious diseases of small (feline herpesvirus, *Leptospira*, canine parvovirus, canine adenovirus, feline leukemia virus, canine distemper virus, etc) and food animals (IBR, BVD virus, TGE virus, *Listeria, Cryptosporidium, Neospora*, etc).

Once the images of interest are identified, multiple measurements of nuclear and cell size and shape, chromatin texture, and other spatial and photometric features can be taken automatically with the aid of fast microcomputers. These data can be interpreted by a variety of diagnostic algorithms, multivariate statistical methods, rule-based expert systems, neural networks, Bayesian-belief networks and others to arrive at automated classifications.

Biogenex has developed products for image analysis for diagnosis and screening purposes. The ChromaVision Automated Cellular Imaging System (ACIS) provides quantitation of staining intensities, percent positive nuclei and area measurements on immunohistochemically (IHC) stained tissue sections.

Applied Imagings Reasearch IHC Analysis suite contains the Hersight, Kisight and Aesight imaging modules each designed specialized for the areas of membraneous, nuclear and cytoplasmic quantification of IHC staining.

Limitation of the techniques available in prior art is the ability to identify and quantify individual cell components. There are several reasons behind this inability. The three major components of cell are nucleus, cytoplasm and membrane. Nucleus is very small compared to cell size. Cytoplasm surrounding nucleus occupies most of the cell volume. Membrane of a cell is a thin layer of fibers holding cytoplasm and nucleus in tact inside. Each of the three components can get stained or unstained or counterstained. If a component is stained it might be visible as brown. If a component is counterstained, it takes blue color. Unstained components are transparent or colorless gray. Observing a three dimensional cell in two dimensions has its own issues. A nucleus might be seen as touching membrane. There could be large variation in the sizes of cell nucleus, cytoplasm and cell itself. Simultaneous identification of components becomes complex if more than one component behaves similar. That is, if nucleus and cytoplasm take stain and appear brown red, detecting the boundary between cytoplasm and membrane is much more difficult than the case where only membrane gets stained. Similarly, it will be very difficult to locate nucleus in a cell if both nucleus and cytoplasm are stained similar. There has been some attempts to use cocktail staining to overcome some of these issues. However, cocktail staining is found to be unsuitable for some applications.

None of the existing products are capable of providing simultaneous quantitation of nucleus, cytoplasm and membrane, which is a key factor for studies of translocation.

However, these attempts still do not solve all of the problems with automated biological analysis systems that have been developed to improve the speed and accuracy of the testing process. Thus, it is desirable to provide an automated biological sample analysis system that not only provides automated analysis of biological samples based on analyzing an intensity of a chemical or biological marker, but also on the morphological features of the biological sample.

SUMMARY OF THE INVENTION

In accordance with preferred embodiments of the present invention, some of the problems associated with automated biological sample analysis systems are overcome. A method and system for automatic digital image based tissue independent simultaneous nucleus, cytoplasm and membrane quantitation is presented.

Plural types of pixels comprising cell components including at least cell cytoplasm and cell membranes from a biological tissue sample to which a chemical compound has been applied and has been processed to remove background pixels and pixels including counterstained components are simultaneously identified. The identified cell components pixels are automatically classified to determine a medical conclusion such as a human breast cancer, a human prostrate cancer or an animal cancer.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 9 is a block diagram illustrating exemplary templates used to detect directional pixels;

FIG. 10 is a flow diagram illustrating an exemplary method for detecting nucleus in possible nucleus, cytoplasm and membrane combinations;

FIG. 12 is a flow diagram illustrating a method for classifying identified cell components;

DETAILED DESCRIPTION OF THE INVENTION

Exemplary Biological Sample Analysis System

Figure 1:
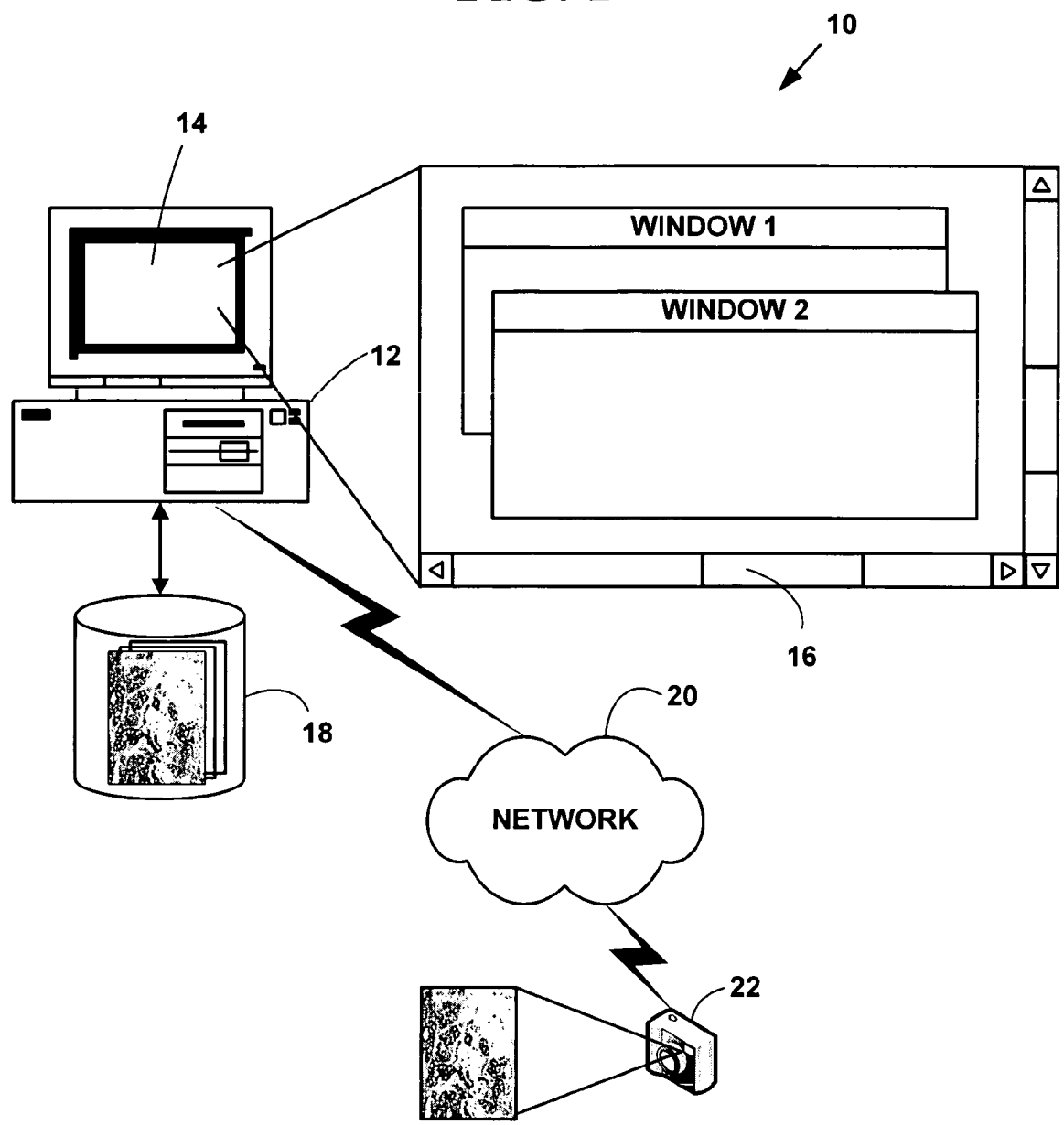
FIG. 1 is a block diagram illustrating an exemplary automated biological sample analysis processing system.

FIG. 1 is a block diagram illustrating an exemplary biological sample analysis processing system 10. The exemplary biological sample analysis processing system 10 includes one or more computers 12 with a computer display 14 (one of which is illustrated). The computer display 14 presents a windowed graphical user interface ("GUI") 16 with multiple windows to a user. The present invention may optionally include a microscope or other magnifying device (not illustrated in FIG. 1) and/or a digital camera 18 or analog camera. One or more databases 20 (one or which is illustrated) include biological sample information in various digital images or digital data formats. The databases 20 may be integral to a memory system on the computer 12 or in secondary storage such as a hard disk, floppy disk, optical disk, or other non-volatile mass storage devices. The computer 12 and the databases 20 may also be connected to an accessible via one or more communications networks 22.

The one or more computers 12 may be replaced with client terminals in communications with one or more servers, or with personal digital/data assistants (PDA), laptop computers, mobile computers, Internet appliances, one or two-way pagers, mobile phones, or other similar desktop, mobile or hand-held electronic devices.

The communications network 22 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 22.

The communications network 22 may include one or more gateways, routers, or bridges. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another.

The communications network 22 may include one or more servers and one or more web-sites accessible by users to send and receive information useable by the one or more computers 12. The one ore more servers, may also include one or more associated databases for storing electronic information.

The communications network 22 includes, but is not limited to, data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is know in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 20 and the present invention is not limited to TCP/UDP/IP.

The one or more database 20 include plural digital images of biological samples taken with a camera such as a digital camera and stored in a variety of digital image formats including, bit-mapped, joint pictures expert group (JPEG), graphics interchange format (GIF), etc. However, the present invention is not limited to these digital image formats and other digital image or digital data formats can also be used to practice the invention.

The digital images are typically obtained by magnifying the biological samples with a microscope or other magnifying device and capturing a digital image of the magnified biological sample (e.g., groupings of plural magnified cells, etc.) with a camera (e.g., digital camera 18).

The term "sample" includes, but is not limited to, cellular material derived from a biological organism. Such samples include but are not limited to hair, skin samples, tissue samples, cultured cells, cultured cell media, and biological fluids. The term "tissue" refers to a mass of connected cells (e.g., central nervous system (CNS) tissue, neural tissue, or eye tissue) derived from a human or other animal and includes the connecting material and the liquid material in association with the cells.

The term "biological fluid" refers to liquid material derived from a human or other animal. Such biological fluids include, but are not limited to, blood, plasma, serum, serum derivatives, bile, phlegm, saliva, sweat, amniotic fluid, and cerebrospinal fluid (CSF), such as lumbar or ventricular CSF. The term "sample" also includes media containing isolated cells. The quantity of sample required to obtain a reaction may be determined by one skilled in the art by standard laboratory techniques. The optimal quantity of sample may be determined by serial dilution.

The term "biomarker" includes an indicator signaling an event or condition in a biological system or biological sample and giving a measure of exposure, effect, or susceptibility. A biomarker is used to indicate a presence of any substance, or a change in any biological structure or process that can be measured as a result of exposure to the biomarker.

An operating environment for the devices biological sample analysis processing system 10 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals by the CPU or processor. An electrical system represents data bits which cause a resulting transformation or reduction of the electrical signals or biological signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Automated Biological Sample Analysis

Figure 2:
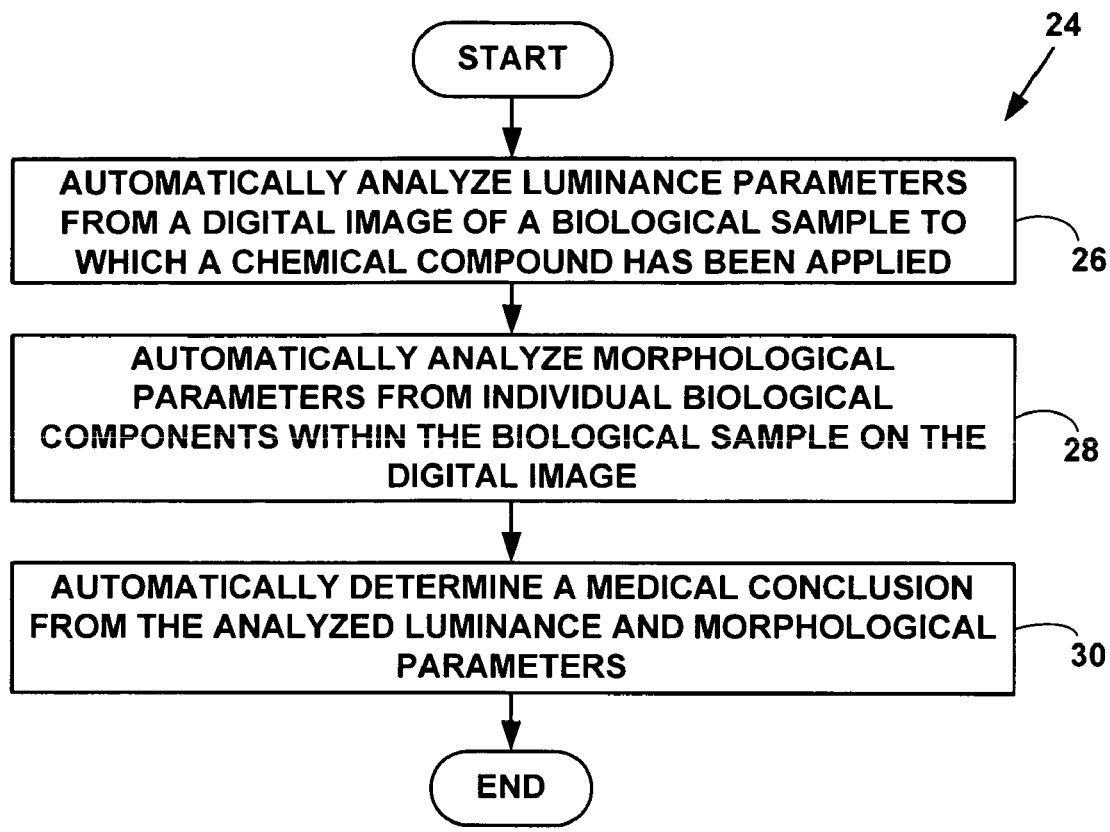
FIG. 2 is a flow diagram illustrating an exemplary method for automated biological sample analysis.

FIG. 2 is a flow diagram illustrating an exemplary Method 24 for automated biological sample analysis. At Step 26, pre-determined parameters from a digital image of a biological sample to which a chemical compound has been applied are modified to make a set of plural biological objects in the digital image more distinct. At Step 28, plural biological objects of interest are located in the set of plural biological objects made more distinct. At Step 30, the located biological objects of interest are identified and classified to determine a medical diagnosis conclusion.

Figure 3:
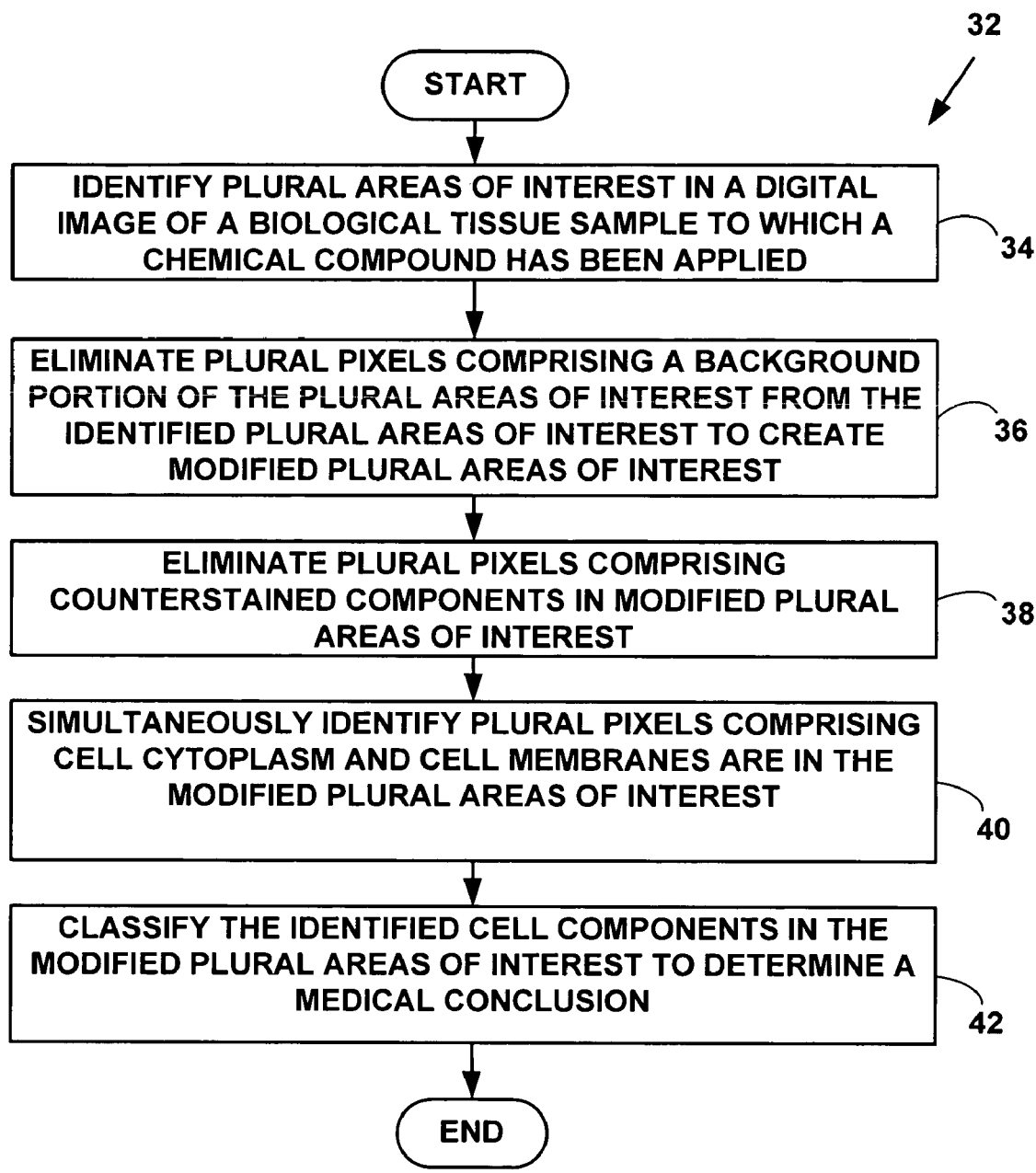
FIG. 3 is a flow diagram illustrating an exemplary method for automated digital image based tissue independent simultaneous nucleus, cytoplasm and membrane quantitation.

Automated Tissue Independent Simultaneous Nucleus, Cytoplasm and Membrane Analysis FIG. 3 is a flow diagram illustrating a Method 32 for automated digital image based tissue independent simultaneous nucleus, cytoplasm and membrane quantitation. At Step 34, plural areas of interest in a digital image of a biological tissue sample to which a chemical compound has been applied are identified. At Step 36, plural pixels comprising a background portion of the plural areas of interest are eliminated from the identified plural areas of interest creating modified plural areas of interest. At Step 38, plural pixels comprising counterstained components in the tissue sample are eliminated from the modified plural areas of interest. At Step 40, plural pixels comprising cell components including cell cytoplasm and cell membranes from the biological tissue sample are simultaneously identified in the modified plural areas of interest. At Step 42, cell components from the modified plural areas of interest are automatically classified to determine a medical conclusion.

Method 32 illustrated with one specific exemplary embodiment. However, the present invention is not limited to this specific embodiment and others embodiments can be used to practice the invention.

In such a specific exemplary embodiment, at Step 34, digital images captured through digital devices appear to be rectangular in shape, which may or may not be the tissue shape. Tissue shape is often circular in shape. Identifying areas of tissue, and eliminating non-tissue parts surrounding a tissue area reduces a computational effort in subsequent analysis steps. At Step 34, edges of a tissue sample are detected in all directions by scanning a digital image from four directions, namely top to bottom, left to right, right to left and bottom up in a linear mode. Scanning of a line is terminated when a pixel belonging to a tissue sample is encountered.

A pixels is said to belong to the tissue sample, if its intensity is within a pre-defined range. A pre-defined range of pixel values is determined such that either dark background pixels or transparent pixels are recognized as non-tissue pixels by being outside the pre-define range. Plural tissue pixels are identified in plural areas of interest in the digital image.

As was discussed above, cancers of the epithelial cells are the most common cancers. Therefore, identification of epithelial cells in a given digital image is completed. For example, identification of ER/PR, Her2, or other markers in the breast cancer tissues is completed via epithelial cells. In breast cancer tissues, one specific marker ER/PR is present only in epithelial cells. Thus, epithelial cells are located.

At Step 36, it is observed that within a tissue sample area, there can be different types of non-cellular material like dust, vacuoles, blood vessels and other artifacts. Most of this non-cellular material does not react to chemical compounds or bio-markers used for staining or counter-staining. This non-cell material is identified as background material and used to eliminate plural pixels in the digital image belonging to the background from subsequent processing stages to create modified areas of interest.

Pixels belonging to either stained or counterstained parts of cells are of interest. When biological tissues are stained, morphological components within individual biological components often include two or more colors that are used to identify the morphological components.

As is known in the art, a "counterstain" is a stain with color contrasting to the principal stain, making a stained structure more easily visible. For example in H/E staining, Eosin is a counterstain to Haematoxylin Using H/E staining, cell membranes stain brown and other cell components stain blue so red and blue color planes are used for analysis. For example, it is known that objects in areas of interest, such as cancer cells, cell nuclei are blue in color when stained with H/E staining. However, if a biological tissue sample when treated with other than H/E staining, then nuclei or other cell components may appear as a different color other than blue. Such pixels could be eliminated using other than red and blue color planes.

In an embodiment using H/E staining, pixels are expected to have either red or blue color dominant compared to pixels belonging to dust particles with a shade of gray or nearly equal values in all three Red, Green, Blue color planes. However, the present invention is not limited to these color pixels and other pixel colors can also be used to practice the invention if depending on a type of stain being used on the tissue sample.

A pixel is considered as the one belonging to foreground if it meets the criteria illustrated by Equation (1) and Equation (2):

$$\text{FirstColor}(x,y) > \text{SecondColor}(x,y) \text{ and } (1-(\text{FirstColor}(x,y)/\text{SecondColor}(x,y))) > \text{Constant1} \quad (1)$$

or $$\text{SecondColor}(x,y) > \text{FirstColor}(x,y) \text{ and } (1-(\text{SecondColor}(x,y)/\text{FirstColor}(x,y))) > \text{Constant2} \quad (2)$$

In one embodiment, using H/E staining, the FirstColor is red and the SecondColor is blue. However, the present invention is not limited to this embodiment and other colors can be used to practice the invention depending on the type of stain being used. In such an embodiment using H/E staining, FirstColor is $R(x,y)$, and SecondColor is $B(x,y)$ for Red pixel and Blue pixel values at an $(x,y)$ position in the digital image. FirstColor can also be blue and SecondColor can also be red.

In one embodiment, Constant1 includes a value of 0.08 and Constant2 includes a value of 0.08. However, the present invention is not limited to this embodiment and other constant values can also be used to practice the invention. In addition, Constant1 and Constant2 do not have to be identical values.

All pixels within an area of interest, not satisfying the conditions of Equation (1) or Equation (2) are considered background pixels. These background pixels are not considered for further processing of the digital image.

Figure 4:
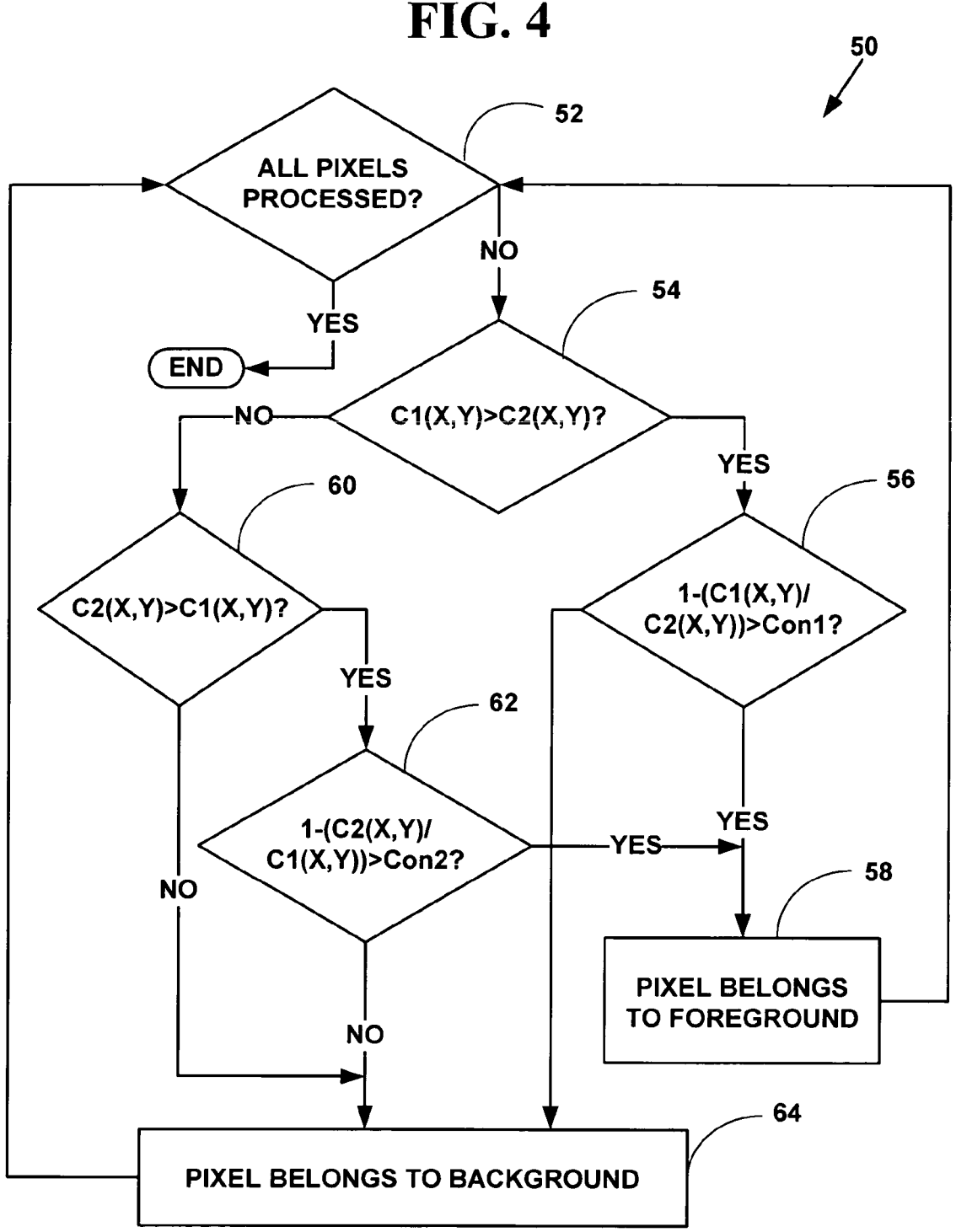
FIG. 4 is a flow diagram illustrating an exemplary Method 50 for eliminating background pixels from a digital image.

FIG. 4 is a flow diagram illustrating an exemplary Method 50 for eliminating background pixels from a digital image at Step 36. However, the present invention is not limited to this exemplary method and other methods can be used to eliminate background pixels at Step 36.

Figure 5A:
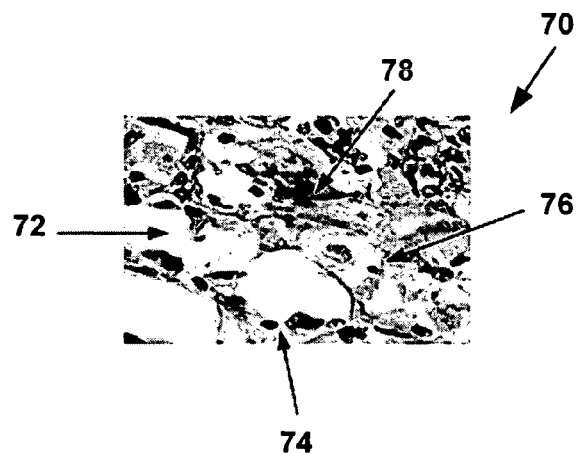
FIG. 5A is a block diagram of a portion of an original digital image.

FIG. 5A is a block diagram illustrating a portion of an original digital image 70. FIG. 5A illustrates a cell vacuole 72, a cell 74, a dust particle 76, and collagen 78.

Figure 5B:
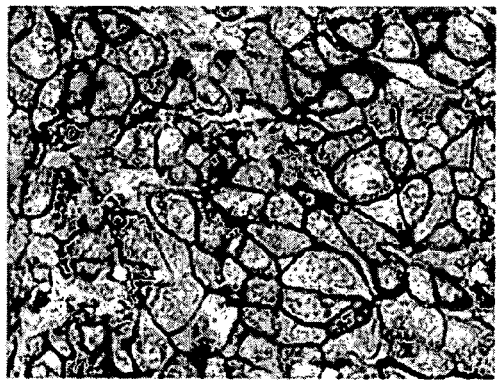
FIG. 5B is a block diagram illustrating another portion of another original digital image.

FIG. 5B is a block diagram illustrating another portion of another original digital image 80.

Figure 5C:
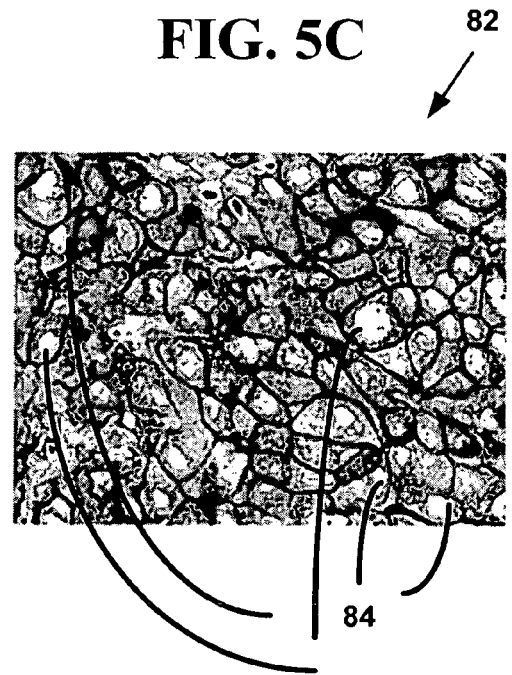
FIG. 5C is a block diagram illustrating removal of background pixels of the original digital image of FIG. 5B.

FIG. 5C is a block diagram illustrating removal of background pixels 82 of the original digital image of FIG. 5B. Background pixels that are removed 84 are illustrated by lighter spots.

Returning to FIG. 3 at Step 38, it is known that a tissue sample includes material other than epithelial cells. Other cells like lymph, cells, stromal cells, artifacts like dust and other impurities, blood vessels and collagen are present in major parts of several tissue specimens. Collagen has a different texture mostly in non-epithelial areas. In some tissue samples collagen might take on a counterstain blue color. Pathologists identify collagen based on texture and extent of uniform texture present in a tissue sample. Normally core size is of the order of few millimeters diameter and field of view is much less than this.

If collagen is present in a tissue it typically will be present across a field of view. Collagen may not be present uniformly across the field of view. Detection and removal of collagen from further analysis of cell components nucleus, cytoplasm and membrane becomes difficult because of its resemblance to cytoplasm in texture. In particular if the cytoplasm takes faint counter-stain giving faint blue color appearance distinction between collagen and cytoplasm becomes very narrow.

To remove counterstained pixels, a percentage of a pre-determined counterstained color (e.g., blue) in an epithelial area is determined. If this pre-determined counterstained epithelial area percentage is less than a pre-determined percentage (e.g., 70%) of a total tissue area of interest after background pixel removal at Step 36, there is no counterstained pixels in the field of view. Otherwise, cell epithelial areas for counterstained components are removed from further processing.

Cell epithelial area is determined by considering pixels having first color plane pixel values (e.g., red) more than second color plane pixel values (e.g., blue). Further, only pixels belonging to a foreground are considered. Digital images are generally at a resolution higher than those required determine cell area. Thus, in one embodiment, a digital image is re-sampled to 50% of its original size in each dimension. Such a digital image usually has high frequency variations, which becomes even more prominent if the pixels with a first color plane (e.g., red) pixel value greater than a second color plane (e.g., blue) pixel value are deleted. A low pass filter, Gaussian blur operation is carried out on this re-sampled image to detect epithelial area. All epithelial area will be dark compared to non cellular area. A pre-determined threshold is used on Gaussian blurred image to determine cell epithelial area. Image size is restored to original size before thresholding. However, the present invention is not limited to such an embodiment and other methods can be used to practice the invention.

Figure 6:
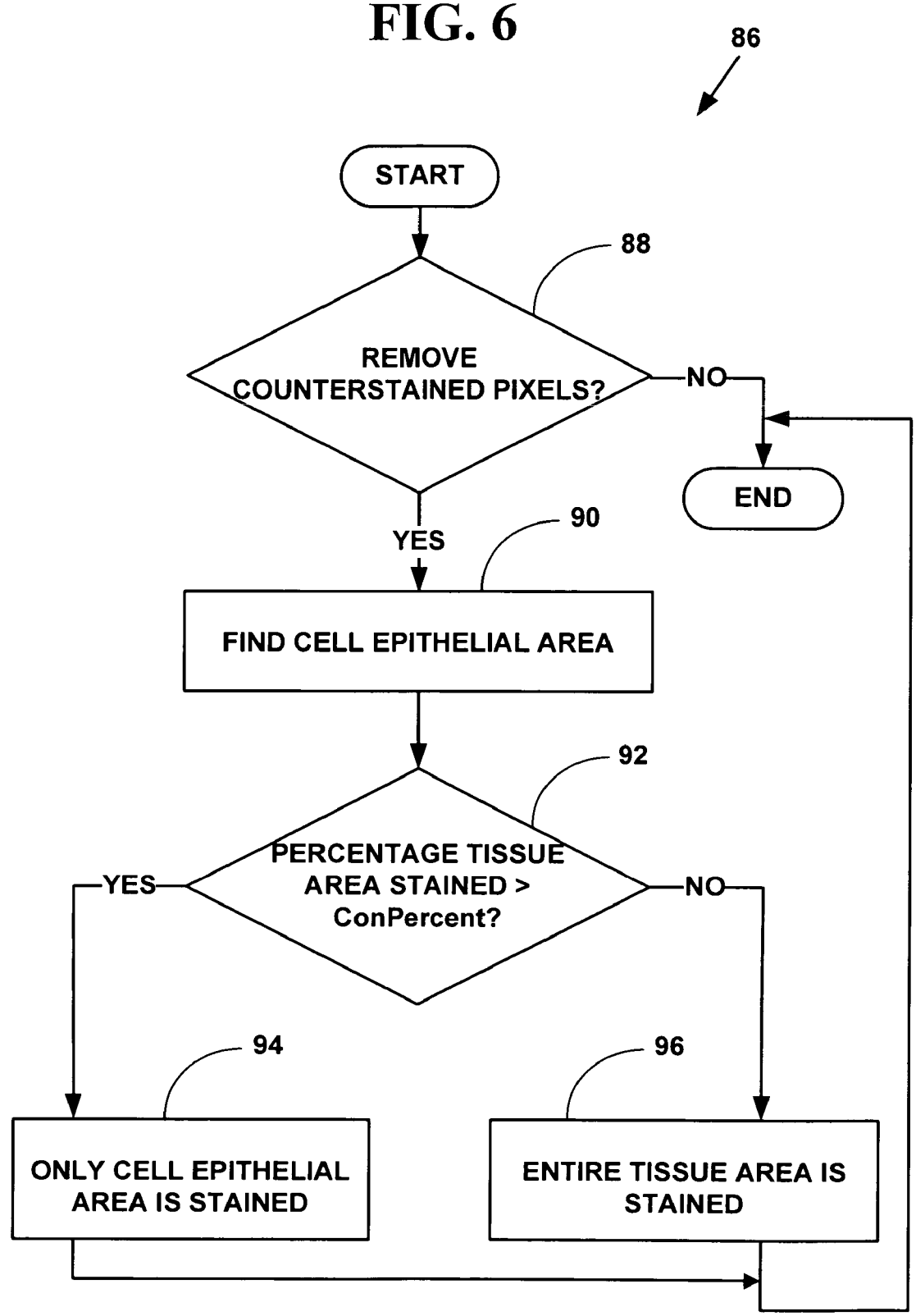
FIG. 6 is a flow diagram illustrating an exemplary method for removing counterstained pixels.

FIG. 6 is a flow diagram illustrating an exemplary Method 86 for removing counterstained pixels at Step 38. However, the present invention is not limited to this exemplary method and other methods can be used to eliminate counterstained pixels at Step 38.

Returning to FIG. 3 at Step 40, a first color plane (e.g., red) of the pixels in a foreground of the digital in the plural areas of interest are considered for simultaneous identification of cell cytoplasm, cell membrane and transitional pixels. When H/E staining is used, it is observed that pixels on a cell membrane are dark brown compared to pixels on stained cytoplasm, which tend to be bright red brown. A distribution of the first color plane (e.g., red) intensity is used to simultaneously decide if a given pixel belongs to a cell cytoplasm or a cell membrane or a transitional pixel. An initial estimate of a threshold level between cytoplasm and membrane is made using an iterative procedure.

Figure 7:
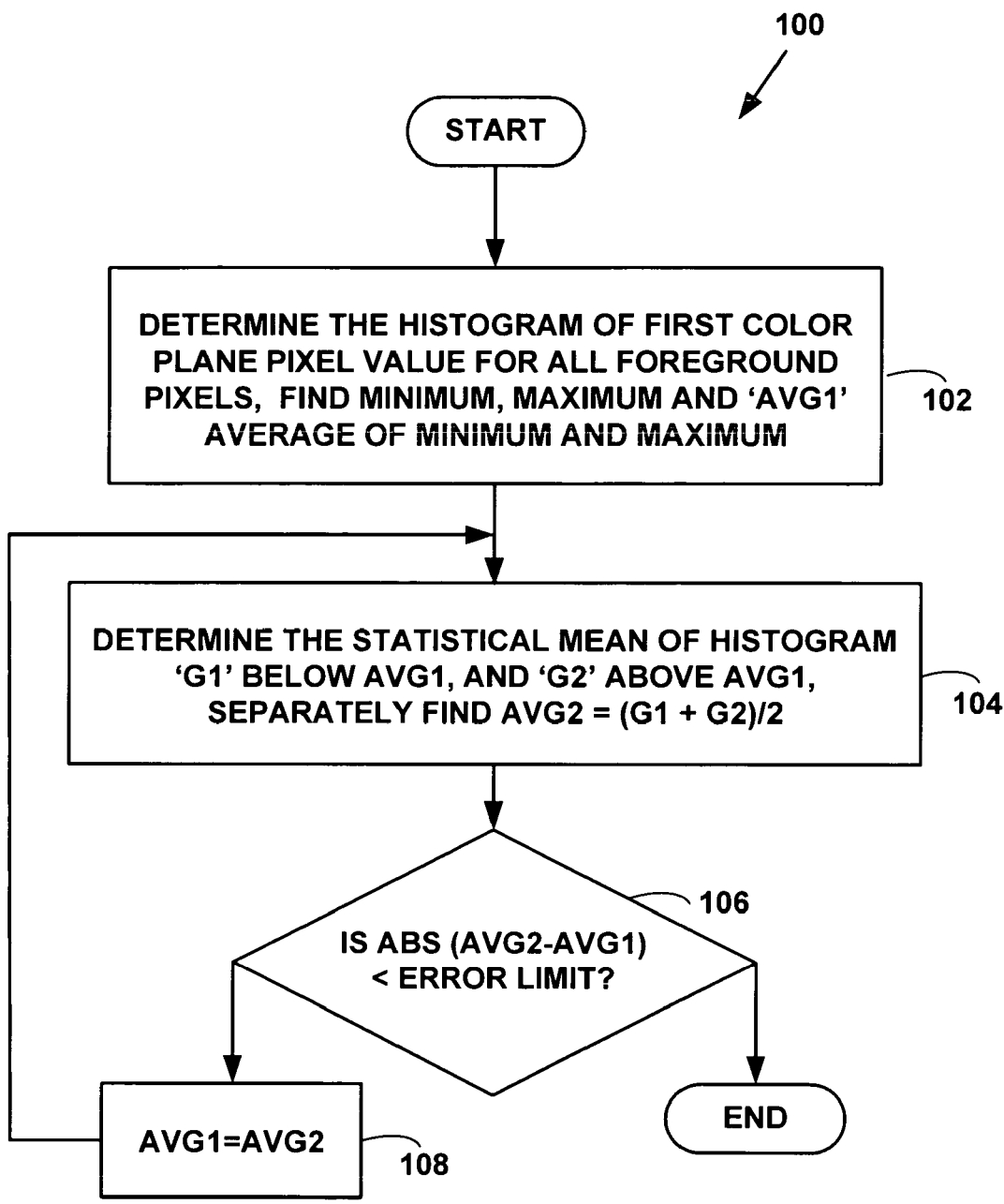
FIG. 7 is a flow diagram illustrating a method for simultaneously identifying pixels comprising cell cytoplasm and cell membranes.

FIG. 7 is a flow diagram illustrating a Method 100 for simultaneously identifying pixels comprising cell cytoplasm and cell membranes at Step 40. However, the present invention is not limited to this exemplary method and other methods can be used to eliminate background pixels at Step 40.

As is illustrated in FIG. 7, a minimum, maximum and average value 'AVG1' of the first color plane (e.g., red) pixels in the foreground are computed. The first color plane histogram is divided into two parts, one below the mean value and the other above the mean value. Mean values of these two parts 'G1' and 'G2' are computed independently. 'AVG2', average of G1 and G2 is computed to determine nature of variation across two halves of histogram. If the difference between 'AVG1−AVG2' is more than a pre-determined value, then next iteration is carried out with AVG1 being replaced with AVG2 for partitioning the histogram. Iteration stops when AVG1=AVG2. Tentatively, pixels below 'AVG2' are identified as membrane and those pixels above 'AVG2' are identified as cytoplasm.

A cell membrane is thin and is not generally not visible at normal optical microscope resolutions. Thresholding methods known in the art of stained pixels to get membrane pixels is typically an over estimate. There is a need to modify some of these tentatively identified membrane pixels into either cytoplasm or original pixel values.

Figure 8:
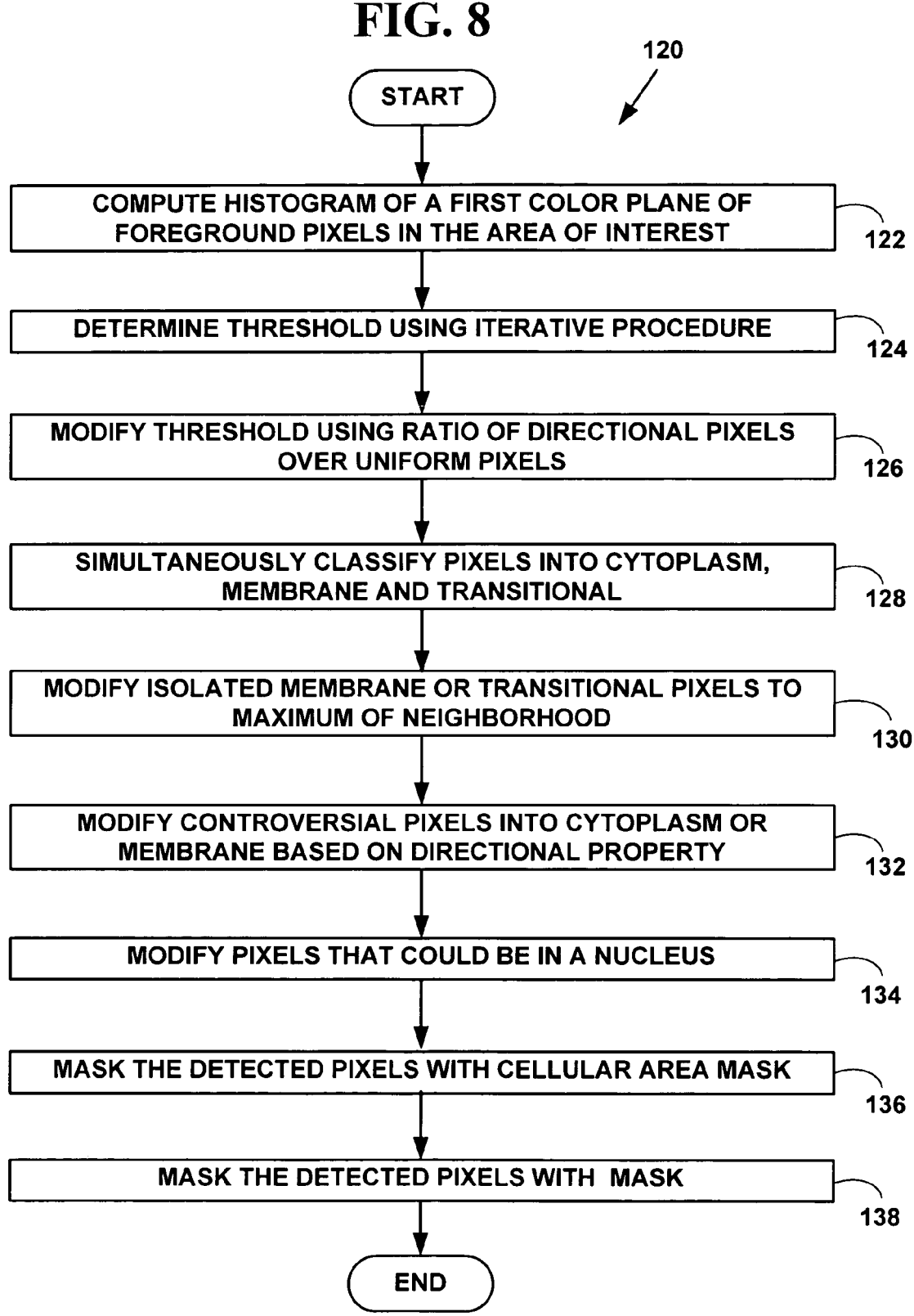
FIG. 8 is a flow diagram illustrating an exemplary Method 120 for identifying cell cytoplasm and cell membranes.

FIG. 8 is flow diagram illustrating an exemplary Method 120 for identifying cell cytoplasm and cell membranes. However, the present invention is not limited to this exemplary method and other methods can be used to identify cell cytoplasm and cell membranes.

It is known that pixels on cell membrane form a closed contour because a cell membrane encloses cytoplasm and nucleus of a cell. Detecting the existence of an arc or line segment at a given pixel provides a means to modify a cytoplasm membrane threshold. In one embodiment, all pixels identified as tentatively as membrane are made black (B) and the rest of pixels made white (W). Out of these black pixels, membrane pixels are identified as membrane pixels are having a directional property. A directional property of a pixel is determined based on its 3×3 neighborhood.

FIG. 9 is a block diagram illustrating exemplary 3×3 templates 160 used to detect directional pixels. However, other than 3×3 templates can also be used to practice the invention.

In FIG. 9, a 3×3 neighborhood around a given pixel "p" is indicated 162. Four templates are used to define possible combination of black and white pixels to determine directional pixels. A black pixel having all eight neighbors black pixels is considered as pixel belonging to a uniform area or non-membrane area. A black pixel satisfying any of the four given templates is recognized as a directional pixel.

A Dominance factor 'D' is computed as illustrated in Equation (3).

$$D = D\text{Constant} * (\text{number of directional pixels/number of uniform pixels}) \quad (3)$$

In one embodiment DConstant has a value of 100. However, the present invention is not limited to this constant value and other constant values can also be used to practice the invention.

Threshold AVG2' is used for tentative segmentation of cytoplasm and membrane pixels is modified as is illustrated in Equation (4).

$$\text{AVG2}' = \text{Constant}D2 * \text{AVG2} + \text{Constant}D3 * D \quad (4)$$

In one embodiment ConstantD2 has a value of 0.8 and ConstantD3 has a value of 3. However, the present invention is not limited to these constant values and other constant values can also be used to practice the invention.

A nature of stained pixel and its eight neighbors is used to determine if a given pixel is cell cytoplasm or membrane or a transitional pixel. All pixels belonging to foreground (irrespective of the staining) are considered for each stained pixel as center pixel.

For every stained pixel (e.g., red pixels with H/E staining), a square root of a product of a center pixel with its eight neighboring pixel is computed individually. Each of these products is examined to increment three different counts, one for membrane, one for cytoplasm and one for transitional pixels.

If a product is less than AVG2', then membrane count is incremented by one. If the product is greater than AVG2', but less than AVG2, then transitional count is incremented by one. If the product is greater than AVG2, then cytoplasm count is incremented by one. After examining all eight neighbors product, membrane count, cytoplasm count and transitional counts are compared. If any one of these three is a maximum count, the pixel is classified accordingly. If there is no maximum (i.e., more than one has the maximum count), then the pixel is classified as transitional.

Isolated membrane pixels and transitional pixels are converted into membrane or transitional depending on the majority of neighborhood pixels. In one embodiment, Table 1 illustrates exemplary combinations used for this conversion. However, the present invention is not limited to the criteria illustrated in Table 1 and other criteria can be used to practice the invention.

TABLE 1

| Isolated pixel | Counts around | Conversion |
|---|---|---|
| Membrane | Non zero transitional count | Membrane pixel converted to transitional |
| Membrane | Zero transitional count, non zero cytoplasm count | Membrane pixel converted to cytoplasm |
| Membrane | Zero transitional count, zero cytoplasm count | Membrane pixel converted to original |
| Transitional | Non zero membrane count | Transitional converted to membrane |
| Transitional | Zero membrane count, non zero cytoplasm count | Transitional converted to Cytoplasm |
| Transitional | Zero membrane count, zero cytoplasm count | Transitional converted to original |

Membrane pixels that could be actually part of a cell nucleus are eliminated. This discrepancy is created because both membrane and nucleus could pick blue color, especially in the case of weakly stained tissues and benign cases. Amongst those pixels identified as membrane, a relationship between first color (e.g., red) and second color (e.g., blue) pixel values in the original input image is verified. If the first color plane pixel value is more than the second color plane pixel value, its neighboring pixels are tested for relation ship between red plane and blue plane. A pre-defined size window of neighborhood pixels is tested. If all neighborhood pixels satisfy the condition that all are identified as membrane and all pixels are such that first color plane pixel value is more than the second color plane pixel value, then the pixel and its neighborhood pixels are restored to original input status. That is, all these pixels are not membrane pixels. Otherwise, status of the membrane pixel is not changed.

Certain membrane pixels are affected if the glass slide with tissue is not washed properly before a digital image from it is created. It is possible to detect membrane pixels by assuming a membrane is like a thin contour around a closed curve or cell. In one embodiment, a gray scale version of background suppressed image is considered for this purpose. However, a color version can also be used to practice the invention. In general, there is significant noise in these gray scale images. It is known that contours in a digital image can be represented by a chain of connected line segments or strokes. Strokes are detected and then a decision is made to determine if a stroke belongs to membrane or not. A smoothened (e.g., averaged over a window of 3×3 pixels) contour is considered for the detection of strokes surrounding a cell. A distribution of pixel intensities in a small window around the current pixel is computed by finding mean value of pixel intensities in a window around designated eight pixels. A difference between average pixel intensity in orthogonal directions and its relation to the current pixel value is used to decide a nature of the current pixel, that is whether the pixel is part of stroke or not. Strokes shorter than a pre-defined limit are deleted as these strokes could be due to noise. A ratio of mean value of pixels on stroke and mean value of non-stroke pixels is used to confirm if the stroke is valid membrane part or not.

Table 2 illustrates criteria used to confirm a nature of a pixel based on strokes. In Table 2, Y-denotes 'yes', X-denotes Don't care and N-denotes 'No'. However, the present invention is not limited to such an embodiment and other criteria can also be used to confirm a nature of a pixel.

TABLE 2

| Nucleus | Cytoplasm | Stroke | Membrane due to Intensity | Confirm |
|---|---|---|---|---|
| Y | X | X | X | Nucleus |
| N | Y | Y | N | Membrane |
| N | N | Y | Y | Membrane |
| N | N | N | Y | Cytoplasm |
| N | Y | N | N | Cytoplasm |
| N | N | N | N | Input value |

In Table 2 the first four columns indicate the provisional identification of a pixel. At this stage a pixel could be identified with one or more cell compartments like a nucleus, cytoplasm or membrane.

Identification of a nucleus is used if the cytoplasm as well as the membrane are also stained. The following filters are used to delete un-wanted objects that are of different natures. However, the present is not limited to such filters and more, fewer or other filters can be used.

TABLE 3

Lymph Filter

Lymph cells are identified based on weighted sum of five parameters. (i) boundary slope of the cell; (ii) Staining Percentage (Lymph cells are not stained); (iii) Average Intensity of cell (lymph cells are dark); (iv) absence of vacuoles; and (v) size in number of pixels.

Stromal Filter

Stromal cells are identified based on thickness percentage, irregularity count on boundary, elongation ratio and circularity of object, and alignment of boundary pixels. Thickness percentage is based on the ratio of number of pixel run-lengths exceeding the estimated radius of nucleus to the size of the bounding rectangle. Pixel run lengths are measured column wise as well as row wise.
Thickness percentage = Runlengths count/(Object Height + Object Width).
If thickness percentage is more than the threshold (25%) the nucleus is classified as stromal nucleus and filtered out
Irregularity Count of Boundary of Object is measured based on the ratio of arc length and chord length between every pair of pixels on the contour that are at pre-defined distance in contour chain code. If the irregularity count for the object is zero and elongation ratio is high the object is filtered as stromal nuclei.

TABLE 3-continued

Artifacts Filter

Artifacts are identified based on irregularity of boundary pixels, sharpness of boundary pixels, uniformity of pixel values in the object, average intensity of the object and distribution of pixels along straight segments and curved segments of boundary. Sharpness of pixels on boundary is calculated from the Gradient Values of Boundary pixels in Hue Plane. Folded Artifacts don't have sharp boundaries. Uniformity of pixel values is also calculated from the Gradient Values of Object Pixels in Hue Plane. Folded Artifacts are blurred and hence there is less variation in Gradient Value along the Object. In Artifacts Number of Pixels along Straight segments of boundary will be more.

Identification of a cell nucleus is completed if the cytoplasm as well as membrane are also stained. Table 4 illustrates exemplary criteria for combinations and appearances of a cell in a digital image. However, the present invention is not limited to the criteria illustrated in Table 4 and other criteria can be used to practice the invention.

TABLE 4

| Combination | Criteria |
| --- | --- |
| Nucleus: stained, Cytoplasm stained, Membrane stained | Red convex objects with red membranous ring with cytoplasm in between |
| Nucleus stained, cytoplasm stained, membrane unstained | Red convex objects, with cytoplasm pixels around it. |
| Nucleus stained, cytoplasm unstained, membrane unstained | Red convex objects |
| Nucleus stained, cytoplasm unstained, membrane stained | Red convex objects enclosed in a membranous ring, unstained cytoplasm pixels in between |
| Nucleus counterstained/unstained, cytoplasm stained, membrane stained | Blue convex objects enclosed in cytoplasm pixels, surrounded by membranous ring |
| Nucleus counterstained/unstained, cytoplasm unstained, membrane stained | Blue convex objects with membranous ring. Unstained cytoplasm pixels in between. |
| Nucleus counterstained/unstained, cytoplasm unstained, membrane unstained | Blue convex objects |
| Nucleus counterstained/unstained, cytoplasm stained, membrane unstained | Blue convex objects with stained cytoplasm pixels around it. |

Cell cytoplasm and membrane pixels are separated. Distinguishing between thick cell membranes and stained nucleus is completed.

FIG. 10 is a flow diagram illustrating an exemplary Method 180 for detecting nucleus in possible cell nucleus, cytoplasm and membrane combinations. However, the present invention is not limited to this exemplary method and other methods can be used to identify cell nucleus, cytoplasm and membrane combinations.

Method 180 checks if interior pixels are classified as membrane. If interior pixels are stained membrane, then this connected object is stained nucleus. If there are some interior pixels that could be either cytoplasm or background or foreground but not membrane type, then the boundary of connected component represents a stained membrane.

In the case of unstained nucleus, there will be some cytoplasm pixels stained or unstained interior to the boundary of connected component. In the case of counterstained nucleus blue color pixels can be used to detect nuclei.

Figure 11A:
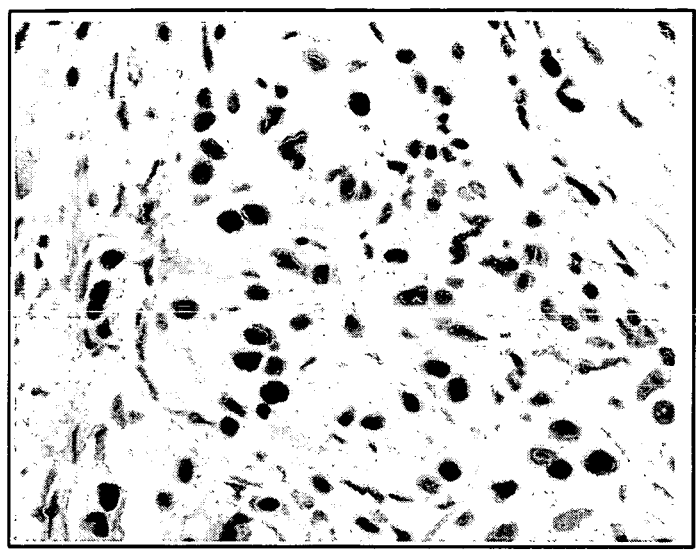
FIG. 11A is a block diagram illustrating an original digital image with stained nuclei inside stained cytoplasm in a digital image.

FIG. 11A is a block diagram 200 illustrating an original digital image with stained nuclei inside stained cytoplasm in a digital image.

Figure 11B:
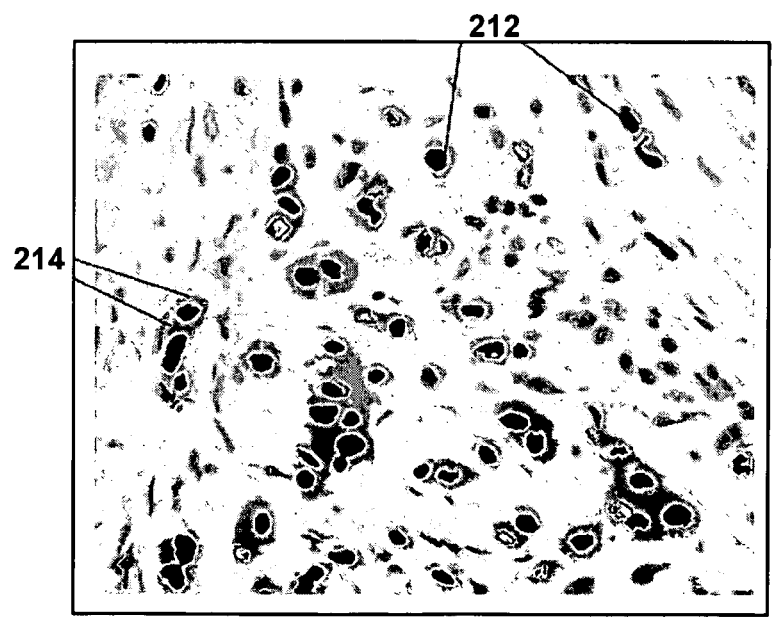
FIG. 11B is a block diagram illustrating detection of stained nuclei and cytoplasm in a digital image.

FIG. 11B is a block diagram 210 illustrating detection of stained nuclei 212 an stained cytoplasm 214 in a digital image.

Nucleus, cytoplasm and membrane parts of a cell have different characteristics. Different conditions are required to measure percentage positivity of nucleus, percentage positivity and score of cell cytoplasms and score of cell membranes.

Table 5 illustrates exemplary tissue level measurements used at Step 40. However, the present invention is not limited to the measurements or constants listed in Table 5 and other measurements and constants can also be used to practice the invention.

TABLE 5

Percentage of positivity of nucleus staining = number of stained nuclei/total number of nuclei.
Pixel volume index for cytoplasm and membrane are computed.
Cytoplasm pixel volume index = Number of cytoplasm pixels/total number of pixels in the foreground..
Membrane Pixel volume index = Number membrane pixels/total number of pixels in the foreground.
Median intensities of cytoplasm pixels, membrane pixels are calculated separately.
    CytoScore is defined as product of Cytoplasm pixel volume index and cytoplasm pixels median intensity.

TABLE 5-continued

MembraneScore is defined as product of Membrane pixel volume index and
Membrane pixels median intensity.
Cytoplasmic scoring:
    If CytoScore >= Con1, it is Cytoplasm3+, wherein Con1 = 0.11
    If CytoScore >= Con2, it is Cytoplasm 2+, wherein Con2 = 0.07
    If CytoScore >= Con3, it is Cytoplasm 1+, wherein Con3 = 0.01
    If CytoScore < Con3, it Is Cytoplasm 0+
    Membrane Scoring:
    If MembraneScore >= Mem5, then it is Membrane 3+, wherein Mem5 = 0.2
    If MembraneScore >= Mem5, wherein Mem5 = 0.1 and
        a) CytoScore >= Con2, it is Membrane 3+
        b) CytoScore < Con2, it is Membrane 2+
    If MembraneScore >= Mem3 and, wherein Mem3 = 0.05
        a) If CytoScore >= Con2, it is Membrane 2+
        b) If CytoScore < Con2, it is Membrane 1+
    If MembraneScore >= Mem2, then it is Membrane 1+, wherein Mem2 = 0.01
    If MembraneScore > Mem1, wherein Mem1 = 0.0005 and
        a)If CytoScore >= Con2, then it is Membrane 1+
        b)IfCytoScore < Con2, then it is Membrane 0+
    If MembraneScore <= Mem1, then it is Membrane 0+

FIG. 12 is a flow diagram illustrating a Method 220 for classifying identified cell components identified simultaneously at Step 40. However, the present invention is not limited to this exemplary method and other methods can be used classify identified cell components.

Cell nucleus classification is done based on different parameters, N1, N2 and N3 based on the size of cell nucleus and others based on chromatin patterns.

Nucleus size in image is dependent on the magnification of the optics used and resolution of the image capture device. For example, in a 40× image, it is observed that 6 pixels correspond to 5 microns. This number is used for calibrating the system. A nucleus is classified as N1, if the number of pixels are in the range 34-135, which corresponds to 5-10 microns. A nucleus is classified as N2, if the number of pixels are in the range 136-307, which corresponds to 10-15 microns. A nucleus is classified as N3, if the number of pixels are in the range 308-855, which corresponds to 15-25 microns.

If a cell nucleus is Pyknotic, all pixels within nucleus tend to be of the same intensity and are of darker. There will be no chromatin seen within nucleus. Uniformity of pixels intensity in an object is determined by computing statistics, mean and standard deviation. In the case of Pyknotic nuclei, standard deviation is typically less than ten. If the nucleus is vesicular, chromatin pattern is clearly visible within nucleus. This can be established if the standard deviation is more than 20. If the standard deviation within a nucleus is more than 10, but less than 20, the nucleus is classified as coarse. In these nucleus chromatin starts growing within nuclei.

In some situations, identifying vesicular nucleus with visible nucleolus plays a significant role in analysis. Nuclei identified are classified into four different categories based on an extent of a stained membrane ring around it. Extent of membrane ring varies from zero degrees in the case of no ring to 360 degrees in the case of full rings. Radial lines are drawn through the center of the nucleus identified in all 360 degrees and find if there exists a membrane pixel on this radial line. Search for membrane pixels is terminated if the length of the radial line exceeds the radius of typical nucleus. In the case of full ring membranes, the number of membrane pixels detected by these radial lines should be 360. Ratio of the number of membrane pixels around a nucleus over 360 gives the extent of membrane ring or membrane percentage.

Returning to FIG. 3 at Step 42, cell components from the modified plural areas of interest are automatically classified to determine a medical conclusion.

In one embodiment of the invention, the medical conclusion includes a medical diagnosis for a human breast cancer or a human prostrate cancer. In another embodiment, the medical diagnosis includes other human or animal cancers.

In one exemplary embodiment, the medical conclusion includes a medical diagnosis based on HER-2/neu overexpression scoring. The HER-2/neu overexpression scoring for example, is typically done using the following system: "1+," those tumors showing at most faint, equivocal, and incomplete membranous staining; "2+," unequivocal, complete membranous pattern, with moderate intensity; and "3+," those tumors that showed areas of strong, membranous pattern. The one to three plus format applied within the one or more modified areas of interest within the digital image to automatically formulate a medical conclusion diagnosis at Step 42. However, the present invention is not limited to this embodiment and other types of classification methods can be used to practice the invention.

Table 6 illustrates examples of HER-2/neu scoring.

TABLE 6

| No. | Amount of overexpression in percentage of cells | HER-2/neu Grade |
|---|---|---|
| 1 | <5 | 0+ |
| 2 | >5 and <15 | 1+ |
| 3 | >15 and <75 | 2+ |
| 4 | >75 | 3+ |

Two different but inter related measurements are carried out on the cells detected and the extent of stained membrane around these cells. In the first measure, distribution of cells into 0+, 1+, 2+ and 3+ is carried out. In the second measure, appropriation of these cell categories in arriving at a score is determined.

Figure 13:
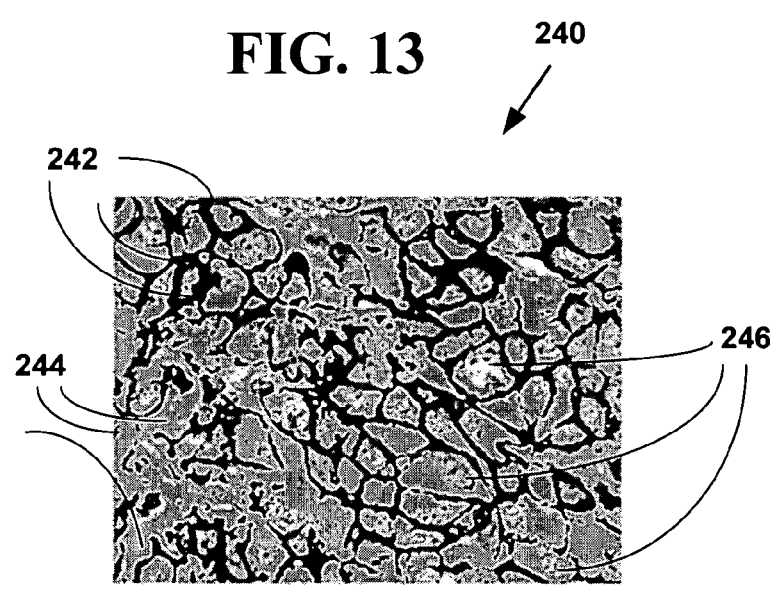
FIG. 13 is a block diagram illustrating a final classification of the tissue sample of the original digital image of FIG. 5A.

FIG. 13 is a block diagram 240 illustrating a final classification of the tissue sample of the original digital image of FIG. 5A. FIG. 13 illustrates plural cell membranes 242, plural cell cytoplasm 244 and plural cell nuclei 246.

Figure 14:
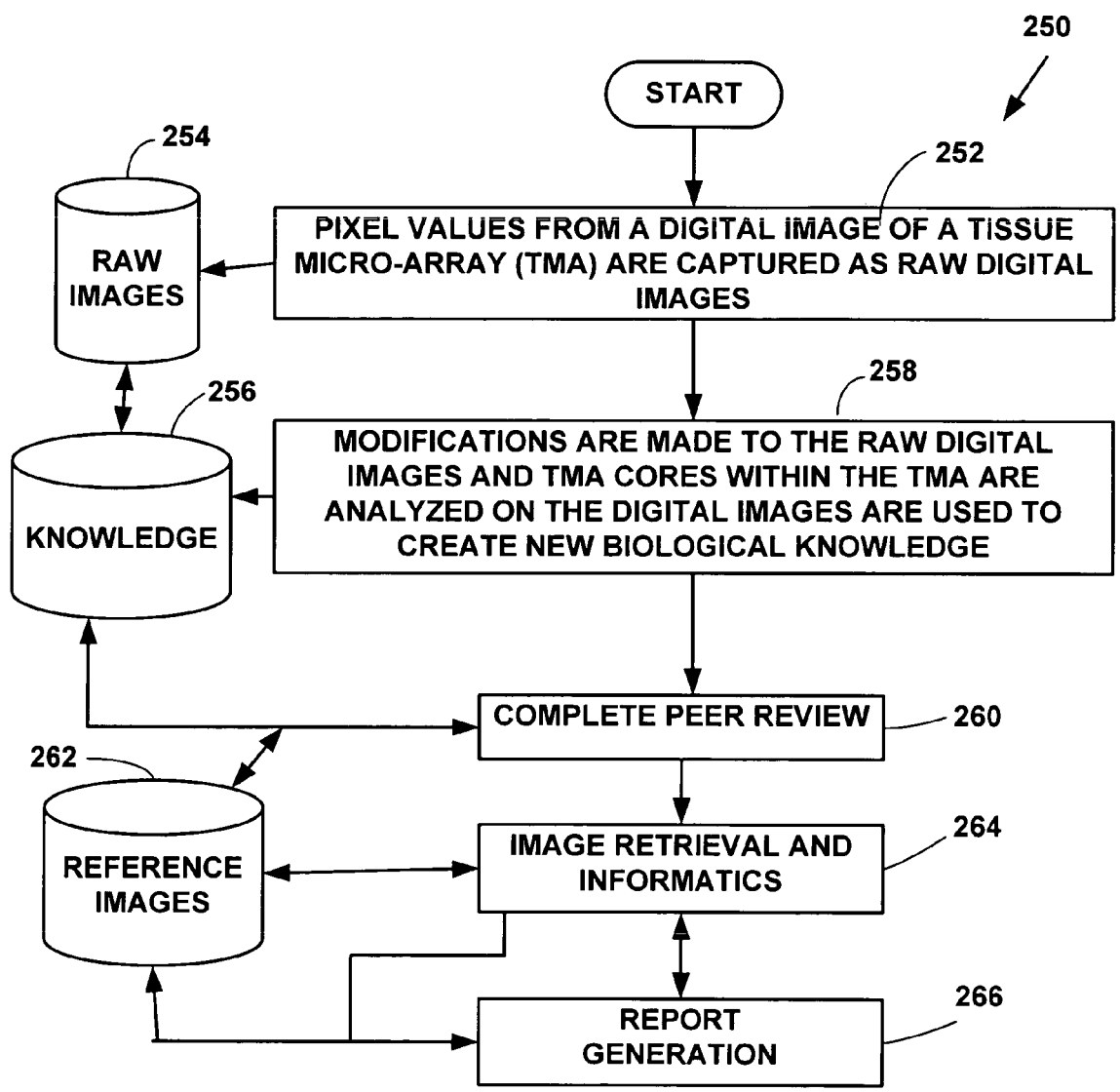
FIG. 14 is a block diagram illustrating an exemplary flow of data in the automated biological sample processing system.

FIG. 14 is a block diagram illustrating an exemplary flow of data 250 in the automated biological sample processing system 10. Pixel values from a digital image of biological tissue samples are captured 252 as raw digital images 254.

The raw digital images are stored in raw image format in one or more image databases 20. The biological tissues samples are analyzed on the digital image and modifications made to the raw digital images 254 are used to create new biological knowledge 256 using the methods described herein. The new biological knowledge is stored in a knowledge database 258. Peer review of the digital image analysis and life science and biotechnology experiment results is completed 260. A reference digital image database 262 facilitates access of reference images from previous records of life science and biotechnology experiments at the time of peer review. Contents of the reference digital image database 262, information on the biological sample and analysis of current biological sample are available at an image retrieval and informatics module 264 that displays information on GUI 14. Conclusions of a medical diagnosis or prognosis or life science and biotechnology experiment are documented as one or more reports. Report generation 266 allows configurable fields and layout of the report. New medical knowledge is automatically created and stored in the knowledge database 258.

In one embodiment of the invention, the methods and systems described herein are completed within an Artificial Neural Networks (ANN). An ANN concept is well known in the prior art. Several text books including "Digital Image Processing" by Gonzalez R C, and Woods R E, Pearson Education, pages 712-732, 2003 deals with the application of ANN for classification of repeating patterns.

In one embodiment, an ANN based on FIG. 14 is used for training and classifying cells from automated tissue analysis over a pre-determined period of time. However, the present invention is not limited to such an embodiment and other embodiments can also be used to practice the invention. The invention can be practiced without used of an ANN.

The present invention is implemented in software. The invention may be also be implemented in firmware, hardware, or a combination thereof. However, there is no special hardware or software required to use the proposed invention.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. An automated method for simultaneously identifying a plurality of pixels in a digital image of a biological tissue stained with a chemical compound, comprising:

considering a first color plane of a plurality of pixels in a foreground of the digital image for simultaneous identification of cell cytoplasm and cell membrane pixels, wherein the digital image has been processed to remove background portions of the digital image and to remove counterstained components of the digital image;

determining a threshold level between cell cytoplasm and cell membrane pixels in the foreground of the digital image; and determining simultaneously with a selected pixel and its eight neighbors from the foreground if the selected pixel is cell cytoplasm pixel, a cell membrane pixel or a transitional pixel in the digital image using the determined threshold level.

2. The method of claim 1 further comprising a computer readable medium have stored therein instructions for causing a processor to execute the steps of the method.

3. The method claim 1 wherein step of determining simultaneously with a selected pixel and its eight neighbors includes:

determining a square root of a product of the selected pixel with its eight neighboring pixels;

comparing the product to the determined threshold level;

incrementing a first counter for a cell membrane, a second counter for cell cytoplasm or a third counter for transitional pixel based on the comparison;

determining whether the first counter, second counter or third counter exceeds a pre-determined maximum value, and if so, classifying the selected pixel based on a counter that exceeds the predetermined maximum value.

4. The method of claim 1 wherein the step of determining a threshold level includes:

determining a directional property of the selected pixel based on a 3×3 pixel neighborhood on a closed contour, wherein cell membrane pixels form a closed contour enclosing cell cytoplasm and cell nucleus of a cell.

5. The method of claim 4 wherein the step of determining a direction property includes determining a dominance factor D comprising:

D=DConstant*(number of directional pixels/number of uniform pixels), wherein DConstant is a pre-determined constant and wherein the dominance factor D is used to determine whether the selected pixel cell has dominant factors of a cell cytoplasm pixel, a cell membrane pixel or a transitional pixel.

* * * * *